(12) United States Patent
Chen

(10) Patent No.: US 12,611,812 B2
(45) Date of Patent: Apr. 28, 2026

(54) CONDITIONING STATION TOOLING

(71) Applicant: Adler Industrial Solutions, Inc., Lee's Summit, MO (US)

(72) Inventor: Jincheng Chen, Leawood, KS (US)

(73) Assignee: Adler Industrial Solutions, Inc., Lee's Summit, MO (US)

(*) Notice: Subject to any disclaimer, the term of this patent is extended or adjusted under 35 U.S.C. 154(b) by 142 days.

(21) Appl. No.: 18/420,278

(22) Filed: Jan. 23, 2024

(65) Prior Publication Data

US 2024/0246283 A1 Jul. 25, 2024

Related U.S. Application Data

(60) Provisional application No. 63/481,258, filed on Jan. 24, 2023.

(51) Int. Cl.
| | | |
|---|---|---|
| *B29C 49/64* | (2006.01) | |
| *B29C 49/48* | (2006.01) | |
| *B29C 49/42* | (2006.01) | |
| *B29C 49/58* | (2006.01) | |

(52) U.S. Cl.
CPC ........ B29C 49/643 (2022.05); B29C 49/4823 (2013.01); B29C 49/6435 (2022.05); *B29C 49/4289* (2013.01); *B29C 2049/4853* (2013.01); *B29C 2049/5858* (2013.01)

(58) Field of Classification Search
CPC ............ B29C 49/4823; B29C 49/6427; B29C 49/643; B29C 49/6435; B29C 2049/4825; B29C 2049/4853; B29C 2049/5858; B29C 49/4289; B29C 2049/023
See application file for complete search history.

(56) References Cited

U.S. PATENT DOCUMENTS

| | | | |
|---|---|---|---|
| 5,176,871 | A | 1/1993 | Fukai |
| 6,171,541 | B1 | 1/2001 | Neter et al. |
| 6,461,556 | B2 | 10/2002 | Neter |
| 6,475,422 | B1 | 11/2002 | Neter et al. |
| 6,476,415 | B1 | 11/2002 | Walker et al. |
| 6,488,878 | B1 | 12/2002 | Neter et al. |
| 6,558,598 | B2 | 5/2003 | Neter et al. |
| 6,802,705 | B2 | 10/2004 | Brand et al. |

(Continued)

FOREIGN PATENT DOCUMENTS

| | | |
|---|---|---|
| JP | 2021000840 | 2/2023 |
| WO | 2007063063 | 6/2007 |
| WO | 2019050021 | 10/2020 |

OTHER PUBLICATIONS

PCT Search Report and Written Opinion dated May 6, 2024 for related PCT Patent Application No. PCT/US2024/012610, 13 pages.

*Primary Examiner* — Monica A Huson
(74) *Attorney, Agent, or Firm* — Hovey Williams LLP; Kameron D. Kelly

(57) ABSTRACT

Conditioning station tooling for adjusting a temperature of a preform. The tooling comprises a mold presenting a cavity configured to receive at least a portion of the preform. The mold is configured to receive the preform such that a gap is present between the mold and the preform. The mold includes an air inlet and an air outlet. The tooling is configured to permit air to be injected from the air inlet, through the gap between the mold and preform, and out of the air outlet. The tooling further comprises a core configured to be received within an interior of the preform and to contact an interior surface of the preform.

17 Claims, 17 Drawing Sheets

(56)                    References Cited

U.S. PATENT DOCUMENTS

| 6,957,954 B2 | 10/2005 | Neter et al. |
| 11,260,575 B2 | 3/2022 | Kawamura et al. |
| 2004/0185136 A1 | 9/2004 | Domodossola et al. |
| 2006/0138696 A1 | 6/2006 | Weinmann |
| 2022/0097287 A1 | 3/2022 | Ogihara et al. |

CONDITIONING STATION TOOLING

CROSS-REFERENCE TO RELATED APPLICATION

The present non-provisional patent application claims priority benefit to U.S. Provisional Patent Application Ser. No. 63/481,258, filed Jan. 24, 2023, and entitled "CONDITIONING STATION TOOLING." The entirety of the above-identified provisional patent application is hereby incorporated by reference into the present non-provisional patent application.

FIELD OF THE INVENTION

Embodiments of the present invention are generally directed to blow mold tooling systems and methods for use in manufacturing plastic articles, such as bottles. More particularly, embodiments of the present invention are directed to conditioning station tooling used during blow molding to condition preforms prior to being formed into resulting articles.

BACKGROUND OF THE INVENTION

Blow molding machines, such as injection stretch blow machines, form hollow, plastic preforms (e.g., plastic tubes) and then convert those preforms into finished articles (e.g., bottles) before the preforms leave the machine. Typically, a turret-like rotation plate on the machine indexes a set of thread splits (which support the preforms) through multiple stations including at least an injection station, a conditioning station, a stretch blow station, and an eject station.

At the injection station, hot molten thermoplastic material is injected into a set of preform molds with which the thread splits are associated so that after the injection cycle is completed, the preforms remain gripped by the thread splits on the rotation plate for indexing to the next station. At the conditioning station, temperatures of the preforms can be adjusted as necessary for proper forming of the resulting articles (e.g., proper shape, structural integrity, appearance, etc.). At the stretch blow station, the preforms remain gripped by the thread splits but are then subjected to mechanical and pneumatic stretching through an internal stretch rod and internally introduced air pressure to expand and fill hollow molds of the stretch blow station. Upon being stretch blown at the stretch blow station, the preforms are transformed into articles. Finally, the rotation plate indexes the thread splits and their supported articles to the ejection station where the thread splits are separated to release the articles. It is noted that each station can include a plurality of molds, such that multiple preforms/articles can be formed each cycle.

Many modern blow molding machines have been modified to achieve a cycle time reduction for the above-described article manufacturing process. Such modifications include the removal of the conditioning station from the machines, so that final articles can be formed from injection molded preforms at a quicker rate. However, it is important to maintain and/or adjust a temperature of the preforms after the preforms have been formed via injection molding at the injection station to obtain resulting articles of sufficient quality. Specifically, such temperature adjustment may be required to properly condition the preforms to be blown into their final article shape within the blowing station. For example, blowing the preforms while the preforms are too hot (e.g., due to heat retention from the injection station) can cause improper article formation and visual defects (e.g., crystallization). Thus, there is a need for conditioning station tooling that can properly maintain and/or adjust the temperature of a preform to be properly blown into a final article.

SUMMARY OF THE INVENTION

One aspect of the present invention concerns conditioning station tooling for adjusting a temperature of a preform. The tooling comprises a mold presenting a cavity configured to receive at least a portion of the preform. The mold is configured to receive the preform such that a gap is present between the mold and the preform. The mold includes an air inlet and an air outlet. The tooling is configured to permit air to be injected from the air inlet, through the gap between the mold and the preform, and out of the air outlet. The tooling further comprises a core configured to be received within an interior of the preform and configured to contact an interior surface of the preform.

A method for manufacturing a preform. The method comprises a step of transporting the preform to a conditioning station of a blow molding machine. An additional step includes adjusting a temperature of the preform at the conditioning station. Such temperature adjusting includes inserting a core within an interior of the preform. An additional step of the temperature adjusting includes positioning the preform at least partially within a cavity of a mold, with an exterior surface of the preform not contacting the mold. An additional step of the temperature adjusting includes supplying air between the mold and the preform to condition the exterior surface of the preform. A further step of the temperature adjusting includes conditioning an interior surface of the preform via contact between the preform and the core.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE FIGURES

Embodiments of the present invention are described herein with reference to the following drawing figures, wherein:

FIG. 1b is a top plan view of the blow molding machine from FIG. 1a;

Figure 1A:
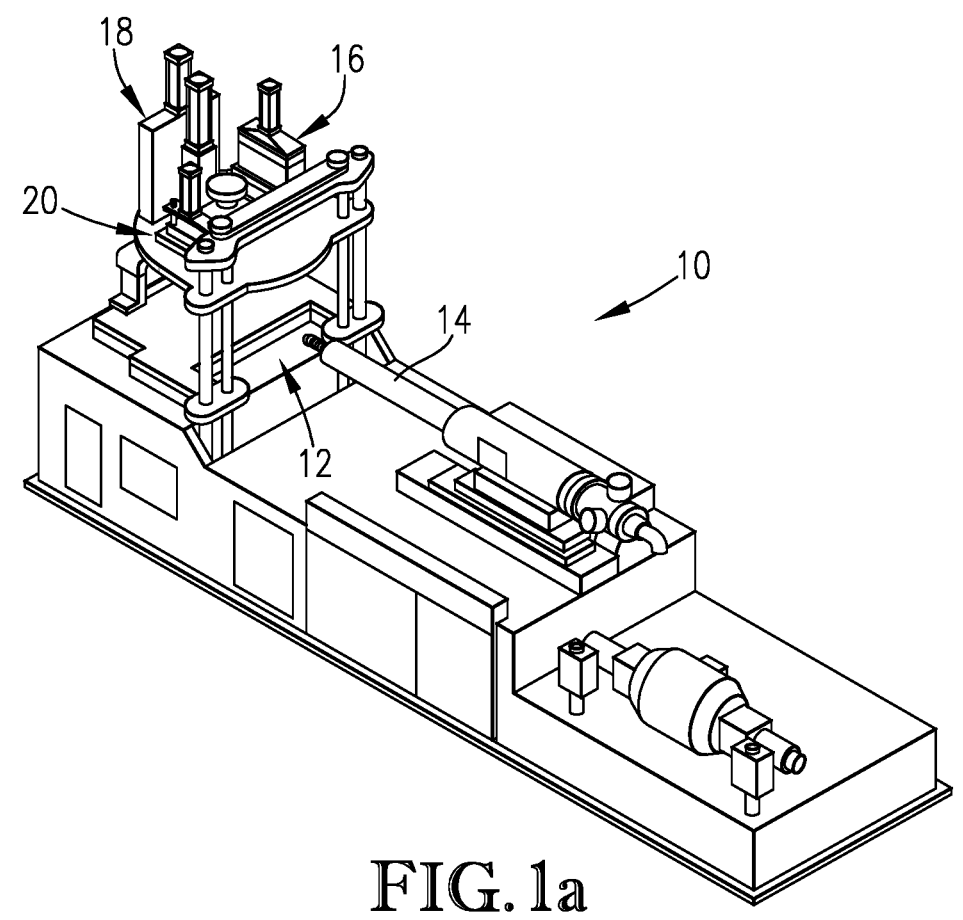
FIG. 1a is a perspective view of a blow molding machine.

The figures are not intended to limit the present invention to the specific embodiments they depict. While the drawings do not necessarily provide exact dimensions or tolerances for the illustrated structures or components, the drawings are to scale with respect to the relationships between the components of the structures illustrated in the drawings.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Relational and/or directional terms, such as "above", "below", "up", "upper", "upward", "down", "downward", "lower", "top", "bottom", "outer", "inner", etc., along with orientation terms, such as "horizontal" and "vertical", may be used throughout this description. These terms retain their commonly accepted definitions and are used with reference to embodiments of the technology and the positions, directions, and orientations thereof shown in the accompanying figures. Embodiments of the technology may be positioned and oriented in other ways or move in other directions. Therefore, the terms do not limit the scope of the current technology.

Figure 1B:
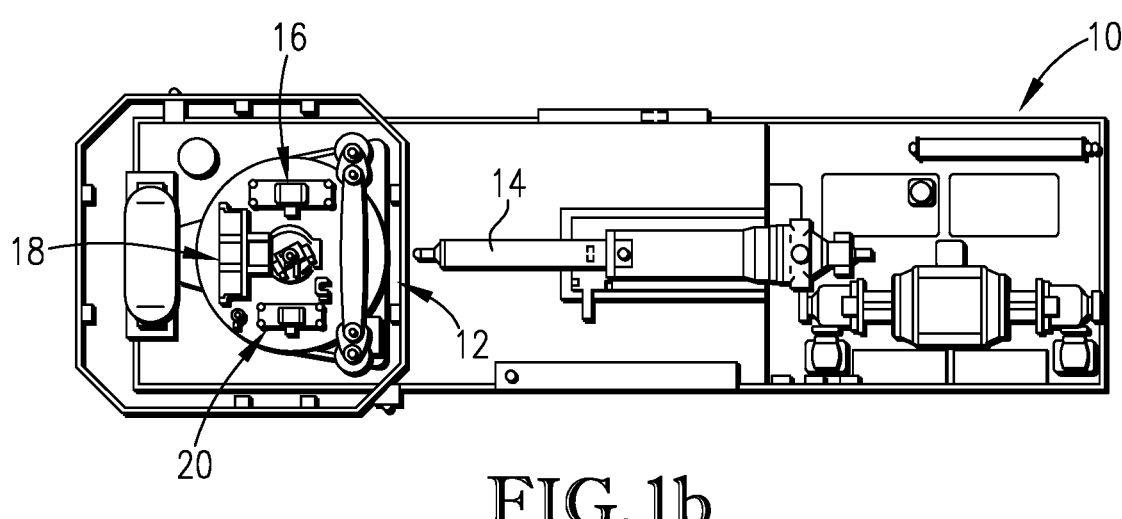
Figure 2:
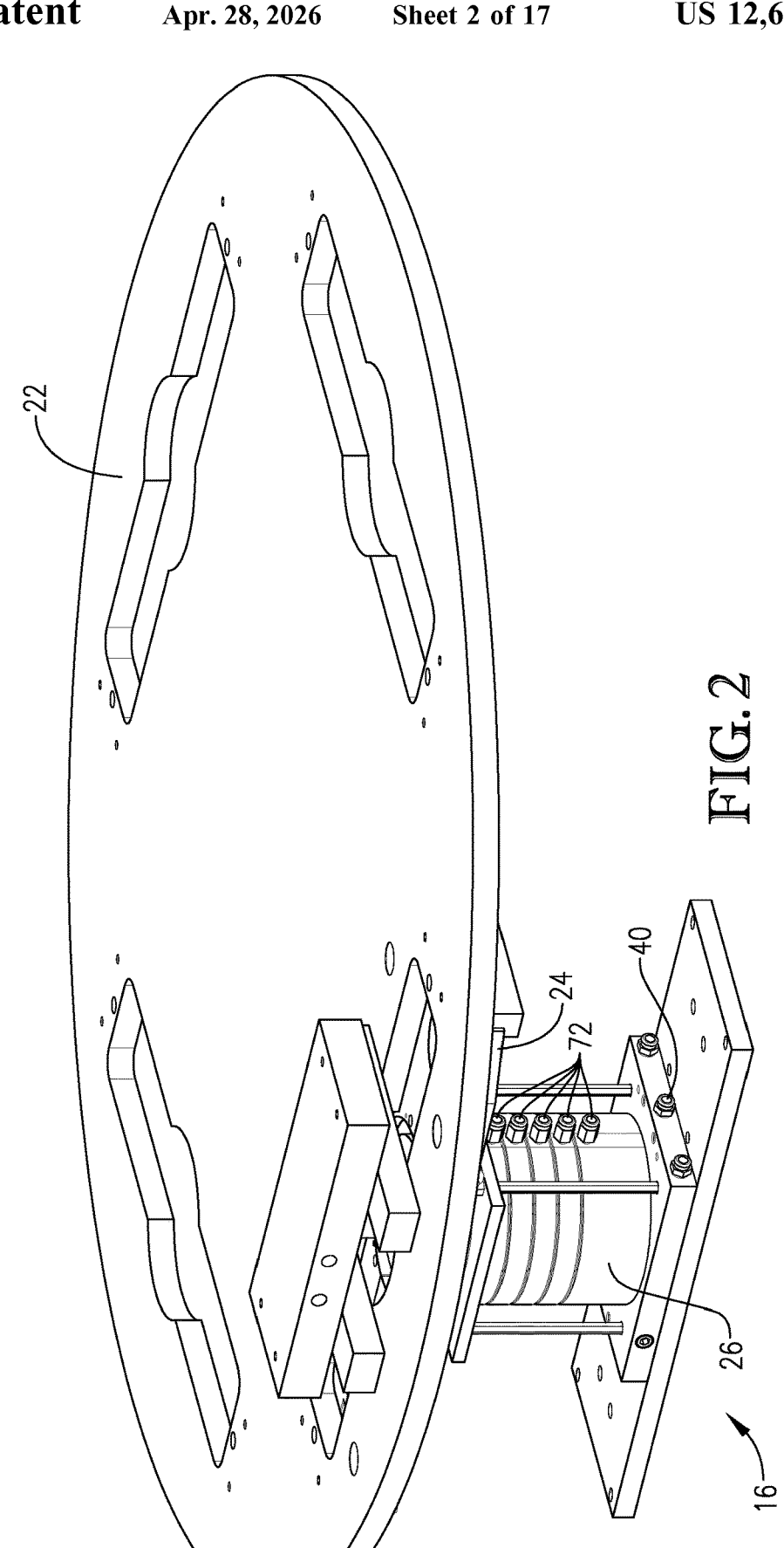
FIG. 2 is an upper perspective view of a rotation plate supporting thread splits at a conditioning station.
Figure 3:
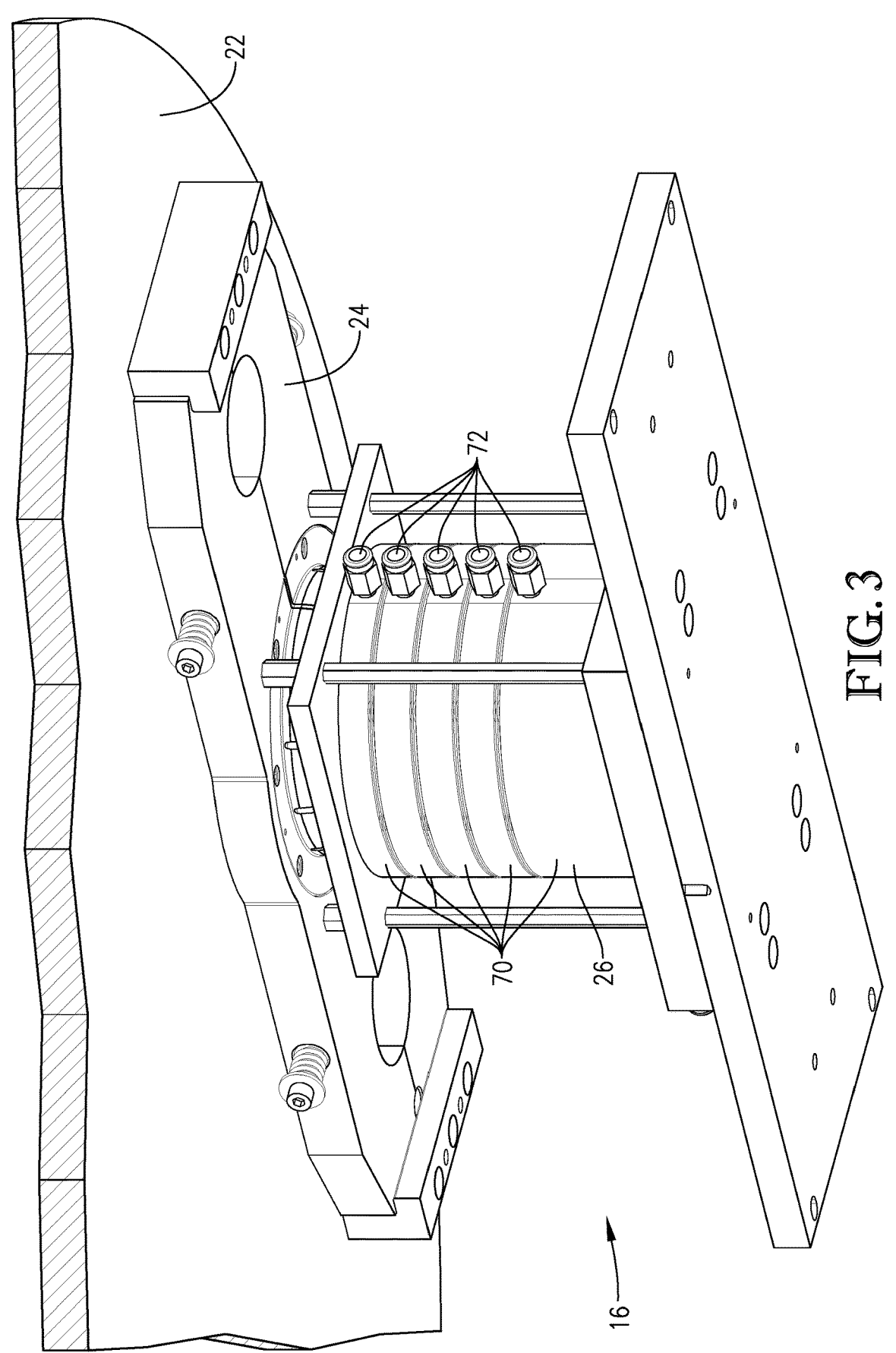
FIG. 3 is a lower perspective view of a portion of the rotation plate and the conditioning station from FIG. 2.

An exemplary injection stretch blow molding machine 10 is shown FIGS. 1*a* and 1*b*. A first, injection station generally denoted by the numeral 12, is where hot, molten thermoplastic material is injected into a set of mold cavities (not shown) from a nozzle 14 to form preforms. Often, the preforms will be shaped as tubes or cups that can be finally formed into articles, such as bottles, cups, containers, etc. A second, conditioning station is generally denoted by the numeral 16 and is the location where preforms molded at the injection station can be subjected to certain additional temperature and/or shape conditioning. A third, stretch blow station is generally denoted by the numeral 18 and is the location where the preforms are blown and/or stretched into their final configuration within blow molds. A fourth, ejection station broadly denoted by the numeral 20 is the location at which the finished articles are released from the machine 10 to gravitate into an awaiting container or conveyor belt for further processing. With reference to FIGS. 2 and 3, a large, turret-like rotation plate 22 is used to transport the preforms and finished articles from one station to the next. Although the machine 10 includes multiple stations (as discussed above), the below description of embodiments of the present invention is generally directed to the conditioning station 16 and associated tooling.

In more detail, embodiments of the present invention are generally directed to tooling for a conditioning station, such as conditioning station 16 of blow molding machine 10 described above. As noted, the conditioning station 16 is a portion of the blow molding machine 10 that can be used to adjust a temperature of a preform or to otherwise modify the form of the preform after the preform has been formed via injection molding at the injection station. Such temperature adjustment or form modification may be required to properly condition the preforms to be blown into their final article shape within the blow station. For instance, blowing the preforms while the preforms are too hot (e.g., due to heat retention from the injection station) can cause improper article formation and visual defects (e.g., crystallization). To address such issues, the newly formed preforms can have their temperature adjusted (e.g., cooled) via the conditioning station 16 prior to being blown within the blow station 18. Although the below description generally describes the conditioning station tooling of the present invention being used to cool the preform, it should be understood that the conditioning station tooling may simultaneously, additionally, and/or alternatively be used to heat the preform or to otherwise modify the form of the preform. Such modification of the form of the preform may include stretching the preform, compacting the preform, modifying the surface of the preform, modifying the thickness of the preform, and/or the like.

FIGS. 2 and 3 illustrate one embodiment of tooling for a conditioning station 16 configured to make temperature adjustments for a preform (not shown). The preform can be moved to the conditioning station 16 via thread splits 24 that grip the finish and/or neck of the preform, such that the preform is secured between the thread splits. The thread splits 24 may be associated with the rotation plate 22, such that rotation of the plate 22 causes a corresponding rotation of the thread splits 24 and the preform gripped by the thread splits 24. Once the thread splits 24 and the preform have been transitioned to the conditioning station 16, the preform can be shifted into a concave cavity presented by a mold 26 of the conditioning station 16. The relative position of the preform with respect to the mold 26 can be adjusted via movement of the mold 26 towards the preform (e.g., in an upward direction towards the preform).

Figure 4:
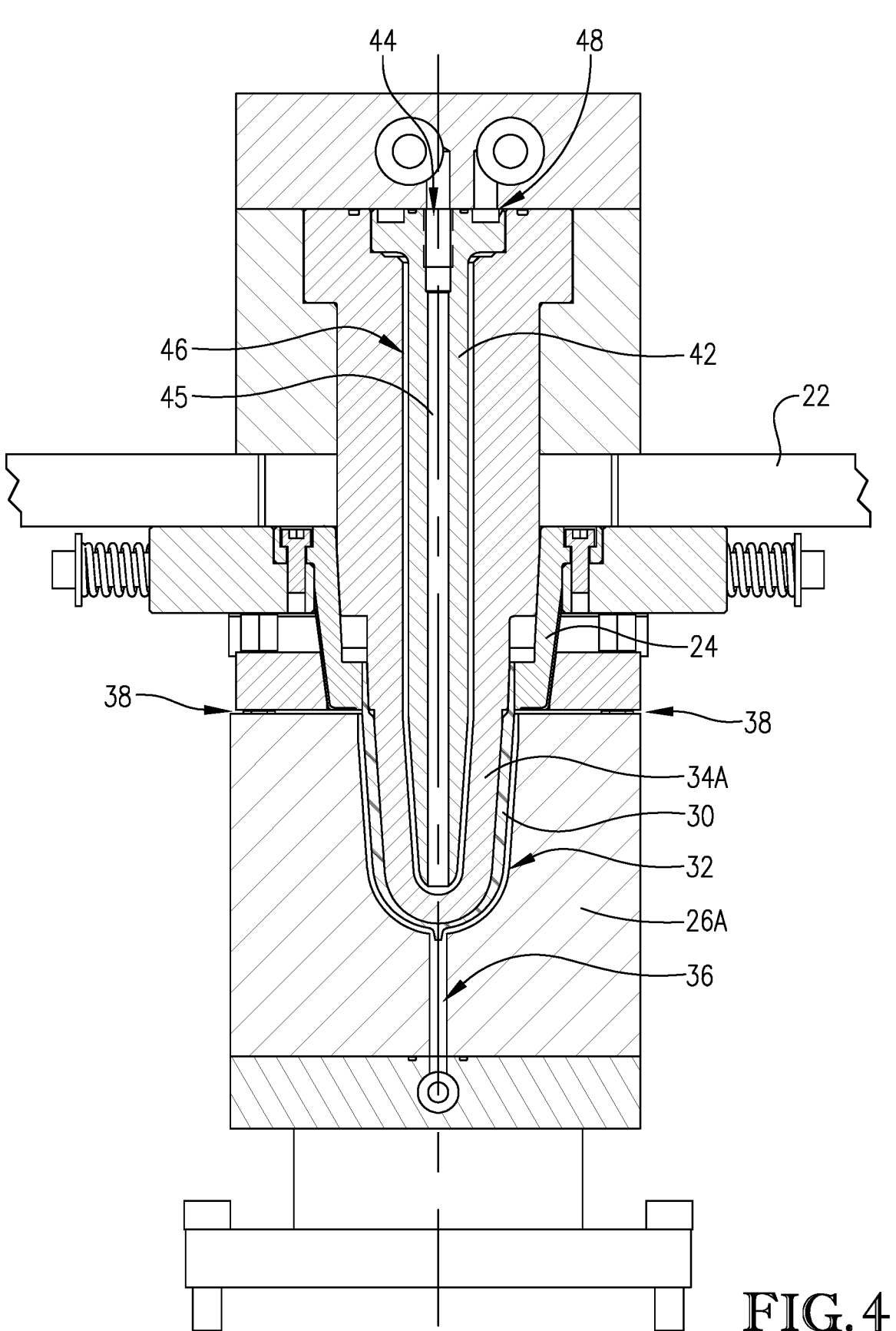
FIG. 4 is a cross section of thread splits supporting a preform with respect to conditioning station tooling according to a first embodiment, with the conditioning station tooling including a mold presenting a cavity to receive the preform and further including a core configured to be received within the preform.

FIG. 4 is a cross section of a first embodiment of tooling for a condition station, with the tooling including a mold 26A. A preform 30 is shown inserted within a cavity presented by the mold 26A, with the preform 30 being shaped as a hollow tube with a closed, lower end; an open, upper end; and a main body extending between the ends. The neck and/or finish of the preform 30 is located at or adjacent to the open, upper end, with a shoulder portion of the preform 30 being a transition between the neck/finish and the main body of the preform 30. As discussed further below, the open end provides access to the hollow interior of the preform 30.

The mold 26A of embodiments of the present invention is configured such that when the preform 30 is inserted within the cavity of the mold 26A, the exterior surface of the preform 30 will not contact the mold 26A. As a result, a gap 32 is present between the preform 30 and the interior surface of the mold 26A. The gap 32 may be created by pausing actuation of the mold 26A as the mold 26A moves toward the preform 30. Such a pause in the actuation of the mold 26A may at least temporarily, prevent the mold 26A from actuating to a completely closed position around the preform 30.

In other embodiments, the gap 32 may be formed between the mold 26A and the preform 30 even with the mold 26A actuated to the fully closed position (i.e., such that a pause in the movement of the mold 26A is not required). In such embodiments, the conditioning station may have one or more mechanical stop elements, such as structural standoffs between the mold 26A and the thread splits 24, that allow the gap 32 to be present even while the mold 26A is in the fully closed position. In still other embodiments, the blow molding machine may be configured, e.g., via programming of a control system (e.g., computing device with at least one processing element and memory element) to shift the mold 26A to the fully closed position with the gap 32 being present without requiring mechanical stop elements.

In addition, the conditioning station may include tooling in the form of a core 34A, which as illustrated in FIG. 4 can be inserted within the interior of the preform 30 (e.g., through the open end of the preform 30), such that the core 34A is in contact with the interior surface of the preform 30. It is noted that although a single preform 30, mold 26A, and core 34A are shown and described, it is understood that the conditioning station of embodiments of the present invention may include a plurality of molds and cores, such that a plurality of preforms can have their temperature adjusted at the conditioning station during a given cycle.

In the configuration illustrated in FIG. 4, both the exterior surface and the interior surface of the preform 30 can be cooled at the conditioning station. In particular, the conditioning station can provide for cooling air to be introduced through the gap 32 between the preform 30 and the mold 26A. For example, a gas inlet 36 may be provided at the bottom of the mold 26A, and a gas outlet 38 may be provided at the top of the mold 26A (e.g., between the mold 26A and the thread splits 24. Air can be provided to the gas inlet 36 via a pneumatic port 40 (see FIG. 2) that is fluidly connected to the gas inlet 36. As a result, a cooling airflow can be caused to flow from the gas inlet 36, through the gap 32, and to the gas outlet 38 (i.e., from bottom to top of the mold 26A). In alternative embodiments, the gas inlet may be at the top of the mold, and the gas outlet may be at the bottom of the mold, such that the cooling airflow flows from top to bottom of the mold 26A. Regardless, such cooling airflow can be used to cool the exterior surface of the preform 30.

Furthermore, the core 34A may include a bubbler mechanism 42 within an interior of the core 34A. The bubbler mechanism 42 may comprise an elongated mechanism positioned within an interior of the core 34A and configured to facilitate the flow of a cooling fluid (e.g., liquid water) through the core 34A. Specifically, the bubbler mechanism 42 may include an inlet 44 that introduces the cooing fluid through an inner channel 45 that extends through the interior of the bubbler mechanism 42 along the length of the bubbler mechanism 42. The cooling fluid exits the channel 45 and flows through an outer channel 46 formed between the bubbler mechanism 42 and an interior surface of the core 34A. The cooling fluid can then exit through the fluid outlet 48. As such, the bubbler mechanism 42 can cool the core 34A, and due to the contact between the core 34A and the preform 30, the core 34A can cool the interior surface of the preform 30.

Thus, in view of the above, the conditioning station of the present invention can cool or otherwise condition both an interior and exterior of a preform. Specifically, the cooling airflow provided through the gap 32 presented between the mold 26A and the preform 30 can cool the exterior of the preform 30, while the cooling fluid flowing through the core 34A and associated bubbler mechanism 42 will cool the interior of the preform 30. With the preform 30 having been sufficiently cooled, the preform 30 can be transferred to the blow station to be blown into a final article.

Figure 5:
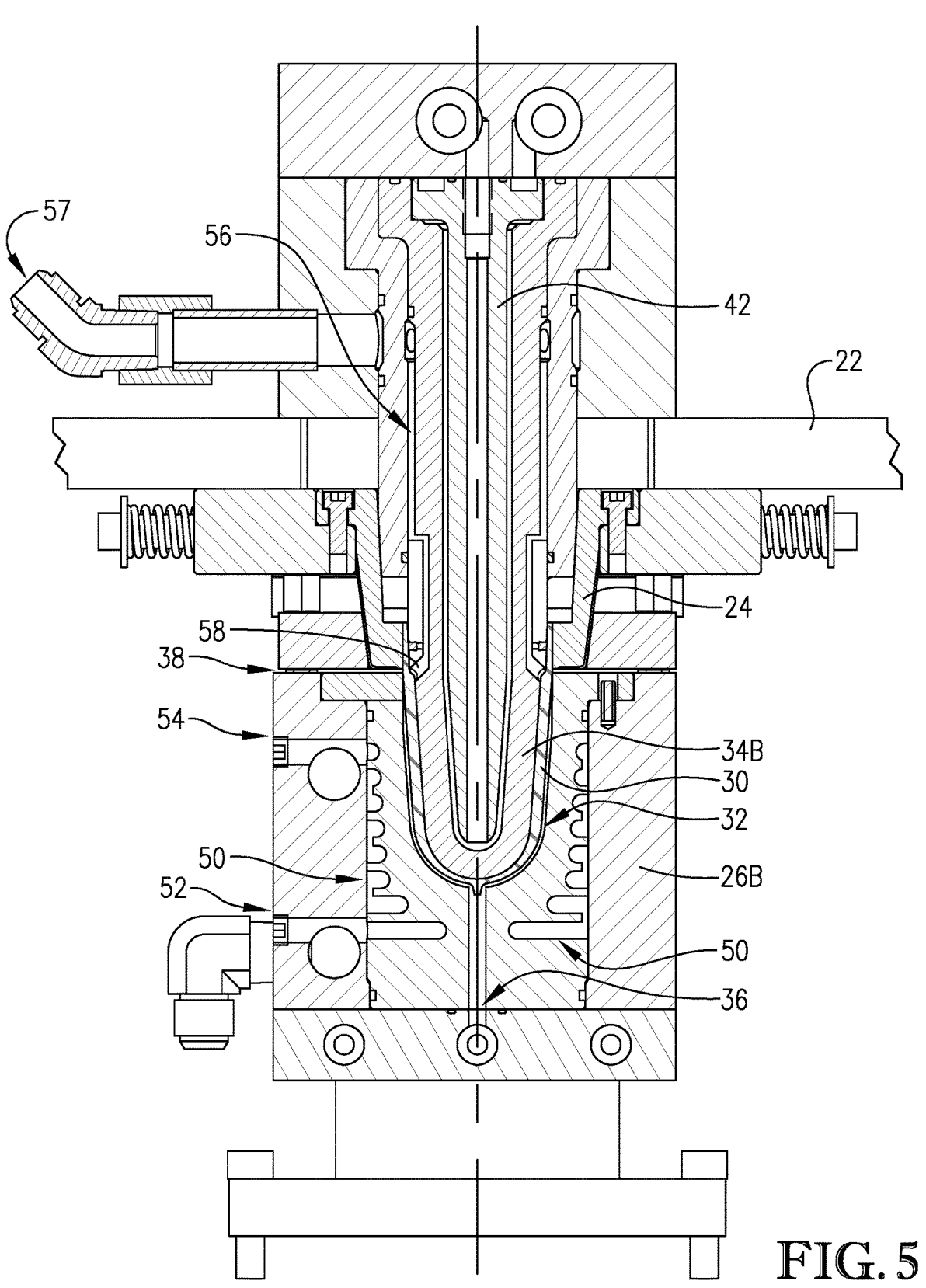
FIG. 5 is a cross section of thread splits supporting a preform with respect to conditioning station tooling according to a second embodiment, with the conditioning station tooling including a mold presenting a cavity to receive the preform and further including a core configured to be received within the preform.

FIG. 5 is a cross section of a second embodiment of tooling for a condition station. The tooling shown in FIG. 5 may be similar to the tooling described above and illustrated in FIG. 4. For example, the tooling of FIG. 5 may include a mold 26B, as well as a core 34B with a bubbler mechanism 42. However, the tooling may further include channels or tubing (i.e., "cooling tubing 50") that extend through the mold 26B. Such cooling tubing 50 may allow a cooling liquid, such as water, to flow through the mold 26B so as to cool the mold 26B. The cooling fluid may be provided to the cooling tubing 50 via a fluid inlet 52 and may be extracted from the cooling tubing 50 via a fluid outlet 54. In some embodiments, the mold 26B may include multiple fluid inlets and outlet 52, 54, such that different amounts of cooling may be provided to different portions of the mold 26B. For example, more cooling fluid (or a lower temperature cooling fluid) may be provided to vertically higher portions of the mold 26B (as measured along the height of the mold 26B shown in FIG. 5), while less cooling fluid (or a higher temperature cooling fluid) may be provided to vertically lower portions of the mold 26B. Thus, precise temperature control of different portions of the length of the preform 30 can be achieved. When different cooling rates are provided at different positions within a mold of a conditioning station (e.g., the mold 26B), such cooling is referred to herein as "variational cooling."

In addition to the above, the core 34B of the tooling of FIG. 5 may include gas channels 56 that allow pressurized air to flow from a gas inlet 57, through the gas channels 56 of the core 34B, and to an injection port 58. The injection port 58 is directed towards a shoulder or neck of the preform 30, such that pressurized air can be injected within the interior of the preform 30.

In view of the above, the conditioning station tooling illustrated in FIG. 5 may function as follows—first, the thread splits 24 may transfer the preform 30 to the conditioning station. Next, the preform 30 can be shifted into the cavity presented by the mold 26B, via movement of the mold 26B upward towards the preform 30. Notably, however, the exterior surface of the preform 30 may not initially contact the mold 26B, such that a gap 32 is present between the preform 30 and the mold 26B. The gap 32 may be created by pausing actuation of the mold 26B as the mold 26B moves toward the preform 30. Such a pause in the actuation of the mold 26B may at least temporarily, prevent the mold 26B from actuating to a completely closed position around the preform 30.

In other embodiments, the gap 32 may be formed between the mold 26B and the preform 30 even with the mold 26B actuated to the fully closed position (i.e., such that a pause in the movement of the mold 26B is not required). In such embodiments, the conditioning station may have one or more mechanical stop elements, such as structural standoffs between the mold 26B and the thread splits 24, that allow the gap 32 to be present even while the mold 26B is in the fully closed position. In still other embodiments, the blow molding machine may be configured, e.g., via programming of a control system, to shift the mold to the fully closed position with the gap 32 being present.

In addition, the core 34B will be inserted within the preform 30, such that the core 34B is in contact with the interior surface of the preform 30. As such, and as with the embodiment described above for FIG. 4, cooling airflow can be caused to flow in the gap 32 between the mold 26B and the preform 30 to cool or otherwise condition the exterior surface of the preform 30. In addition, water from the bubbler mechanism 42 can cool the core 34B, and thus, cool or otherwise condition the interior surface of the preform 30 due to the core 34B contacting the interior surface of the preform 30.

Next, if the mold 26B is not already in the fully closed position, the mold 26B can continue to move upward to the fully closed position, and the airflow through the gap 32 (via the gas inlet 36 and the gas outlet 38 of the mold 26B) can be halted. In such a configuration, air can be injected into the interior of the preform 30 from the injection port 58 of the core 34B. Specifically, air will be introduced via the gas inlet 57 and will flow through the gas channels 56 of the core 34B. The air will flow from the gas channels 56 to the injection port 58, where the air will be directed at the shoulder of the preform 30 (it is noted that the shoulder of the preform is a transition portion of the preform 30 connecting the finish and the main body of the preform 30). Such injected air will inflate the preform 30 to force the exterior surface of the preform 30 against the mold 26B, where the exterior surface of the preform 30 can be cooled or otherwise conditioned by the mold 26B (with such cooling enhanced by the water flowing through the cooling tubing 50 of the mold 26B).

As noted above, in some embodiments, the mold 26B may include variation cooling with several independent sets of cooling tubing within the mold 26B (each independent set referred to herein as a cooling circuit). Such independent cooling circuits may be placed at specified locations within the mold to provide different cooling rates to different portions of the preform 30. For example, separate cooling circuits may be arranged at distinct vertical positions within the mold 26B, with each cooling circuit configured to provide a distinct cooling rate to a particular portion of the preform 30 (e.g., with each portion spaced along a length of the preform 30). To provide distinct cooling rates, each cooling circuit can allow a cooling fluid to flow therethrough, with the cooling fluid having a different temperature than the cooling fluid flowing through other cooling circuits. Thus, the different cooling circuits can permit the mold 26B to have multiple cooling zones that each cool a specific portion of the preform 30 at a specific rate. Such differences in the cooling rates of the portions of the preform 30 can be beneficial in controlling the wall thicknesses of the preforms 30 and of the resulting articles that are formed at the blow station.

It is noted that in the fully closed position, the mold 26B may contact the exterior surface of the preform 30 at the shoulder of the preform. However, in some embodiments, the mold 26B may not automatically contact the shoulder of the preform 30 (even in the fully closed position) until the preform 30 is inflated against the mold 26B by the air injected into the preform 30 by the injection port 58 of the core 34B. It is further noted that upon injection of the pressurized air into the preform 30 to inflate the preform 30 by the core 34B, any remaining air that was present in the gap 32 between the mold 26B and the preform 30 may be forced out of the gap 32 (e.g., vented) through the gas inlet 36 and/or gas outlet 38 of the mold 26B. After a sufficient amount of time has elapsed, the airflow through the core 34B can be stopped, the core 34B can be moved up away from the preform 30, and the mold 26B can be moved down away from the preform 30. The preform 30 may then, after being sufficiently cooled, be transferred to the blow station to be blown into an article.

Figure 6:
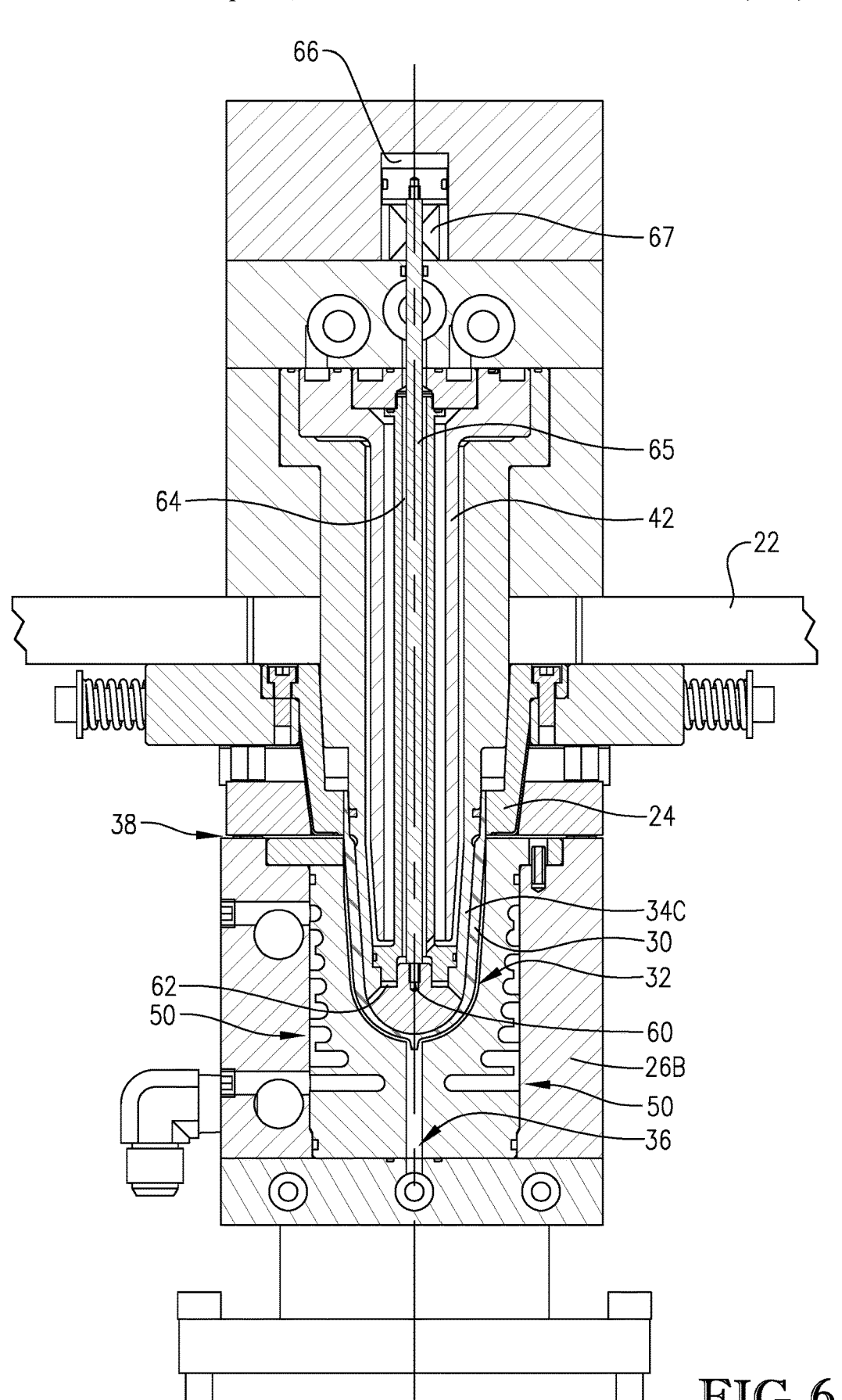
FIG. 6 is a cross section of thread splits supporting a preform with respect to conditioning station tooling according to a third embodiment, with the conditioning station tooling including a mold presenting a cavity to receive the preform and further including a core configured to be received within the preform.

FIG. 6 is a cross section of a third embodiment of tooling for a condition station. The tooling shown in FIG. 6 may be similar to the tooling described above and illustrated in FIG. 5. For example, the tooling of FIG. 6 may include the mold 26B with cooling tubing 50 therein. In addition, the tooling may include a core 34C with a bubbler mechanism 42. However, the core 34C may have a different configuration for injecting air into the interior of the preform 30. In particular, the core 34C may have an open, distal end that is configured to be received within the interior of the preform 30. The distal end may include an actuating tip 60 that can be actuated towards and/or away from the closed end of the preform 30 to activate a valve within the core 34C to cause pressurized air to be injected into the interior of the preform 30 via a gas injection port 62 positioned at or adjacent to the distal end of the core 34C. Specifically air can flow through a gas conduit 64 centrally positioned within the core 34C and extending along the length of the core 34C. As such, pressurized air can be provided to the core 34C, where such pressurized air can flow through the gas conduit 64 and injected into the interior of the preform 30 (i.e., towards a bottom, interior surface of the preform 30) via the injection port 62.

In view of the above, the conditioning station tooling illustrated in FIG. 6 may work as follows—first, the thread splits 24 may transfer the preform 30 to the conditioning station. Next, the preform 30 can be shifted into the cavity presented by the mold 26B, via movement of the mold 26B upward towards the preform 30. Notably, however, the exterior surface of the preform 30 may not contact the mold 26B, such that a gap 32 is present between the preform 32 and the mold 26B. The gap 32 may be created by pausing actuation of the mold 26B as it moves toward the preform 30. Such a pause in the actuation of the mold 26B may at least temporarily, prevent the mold 26B from actuating to a completely closed position around the preform 30.

In other embodiments, the gap 32 may be formed between the mold 26B and the preform 30 even with the mold 26B actuated to the fully closed position (i.e., such that a pause in the movement of the mold 26B is not required). In such embodiments, the conditioning station may have one or more mechanical stop elements, such as structural standoffs between the mold 26B and the thread splits 24, that allow the gap 32 to be present even while the mold 26B is in the fully closed position. In still other embodiments, the blow molding machine may be configured, e.g., via programming of the control system, to shift the mold 26B to the fully closed position with the gap 32 being present.

In addition, the core 34C will be inserted within the preform 30, such that the core 34C is in contact with the interior surface of the preform 30. As such, and as with the embodiment described above, cooling airflow can be caused to flow in the gap 32 between the mold 26B and the preform 30 to cool or otherwise condition the exterior surface of the preform. In addition, water from the bubbler mechanism 42 can cool the core 34C, and thus, cool or otherwise condition the interior surface of the preform 30 due to the core 34C contacting the interior surface of the preform 30.

Next, if the mold 26B is not already in the fully closed position, the mold 26B can continue to move upward to the fully closed position, and the airflow through the gap 32 (via the gas inlet 36 and the gas outlet 38 of the mold 26B) can be halted. As noted above, the actuating tip 60 of the core 34C may be positioned at the distal end of the core 34C. Specifically, the actuating tip 60 may be operably connected to an elongated piston 65 that extends centrally, along the length of the core 34C. In some embodiments, the tip 60 may form part of the piston 65. The piston 65 (and thus the tip 60) may be extended downward via pressurized air being supplied to a cylinder space 66 positioned with an upper portion of the conditioning station tooling. Once the supply of pressurized air to the cylinder space 66 is halted, the piston 65 (and thus the tip 60) may be retracted upward via a spring force provided by a spring 67 also positioned within the upper portion of the conditioning station tooling and operably connected to the piston 65. As such, the actuating tip 60 of the core 34C can be actuated downward by pressurized air being introduced into the cylinder space 66 to extend the piston 65 downward, thereby opening the valve within the core 34C to allow airflow to be injected, via the injection port 62 of the core 34C, into the interior of the preform 30. Such airflow will inflate the preform 30 to force the exterior surface of the preform 30 against the mold 26B, where the exterior surface of the preform 30 can be cooled or otherwise conditioned by the mold 26B (with such cooling enhanced by the water flowing through the cooling tubing 50 of the mold 26B). As discussed previously, the mold 26B may include variational cooling in the form of several independent sets of cooling tubing within the mold 26B (each independent set referred to herein as a cooling circuit). Such independent cooling circuits may be placed at specified locations within the mold 26B to provide different cooling rates to different portions of the preform 30. For example, separate cooling circuits may be arranged at distinct vertical positions within the mold 26B, with each cooling circuit configured to provide a distinct cooling rate to a particular portion of the preform 30 (e.g., with each portion spaced along a length of the preform 30). To provide distinct cooling rates, each cooling circuit can allow a cooling fluid to flow therethrough, with the cooling fluid having a different temperature than the cooling fluid flowing through other cooling circuits. Thus, the different cooling circuits can permit the mold 26B to have multiple cooling zones that each cool a specific portion of the preform at a specific rate. Such differences in the cooling rates of the portions of the preform 30 can be beneficial in controlling the wall thicknesses of the preform 30 and of the resulting article that is formed at the blow station.

It is noted that upon injection of the pressurized air into the preform 30 to inflate the preform 30 by the core 34C, any remaining air that was present in the gap 32 between the mold 26B and the preform 30 may be forced out of the gap 32 through the gas inlet 36 and/or gas outlet 38 of the mold 26B. Furthermore, the core 34C may be configured to further cool or otherwise condition (e.g., stretch) the preform 30 via contact between the tip 60 of the core 34C and the interior of the preform 30. Such cooling or other conditioning via contact provided by the tip 60 may only be provided for a pre-established period of time. After a sufficient amount of time has elapsed, the airflow from the core 34C can be stopped. Specifically, the supply of pressurized air to the cylinder space 66 can be halted, such that the piston 65 and the tip 60 are retracted upward away from the preform 30. Such retraction of the tip 60 will cause the valve within the core 34C to close, thereby halting the airflow from the injection port 62 of the core 34C into the interior of the preform 30. As such, the core 34C can be moved up away from the preform 30, and the mold 26B can be moved down away from the preform 30. The preform 30 may then, after being sufficiently cooled or otherwise conditioned, be transferred to the blow station to be blown into an article.

Figure 7:
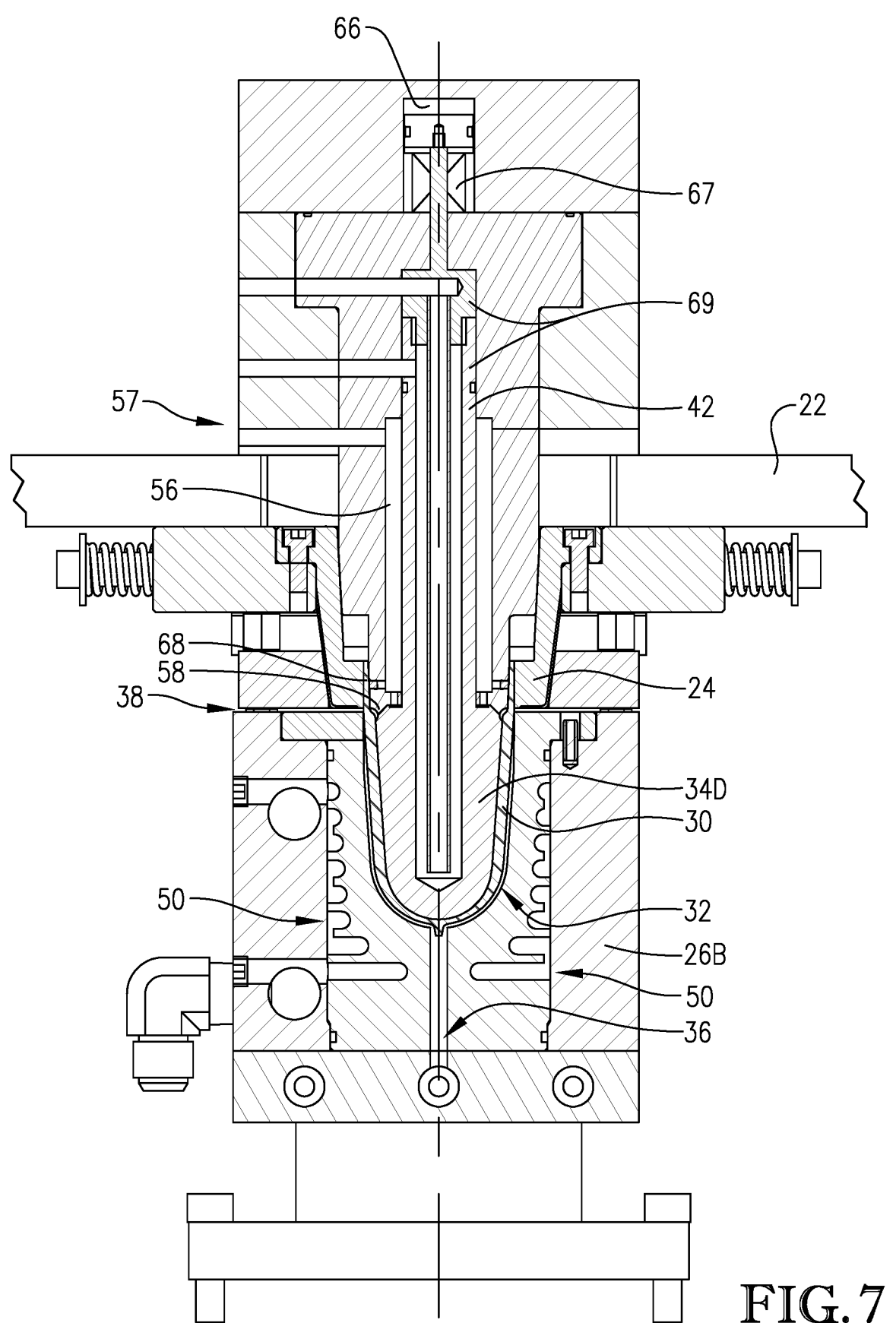
FIG. 7 is a cross section of thread splits supporting a preform with respect to conditioning station tooling according to a fourth embodiment, with the conditioning station tooling including a mold presenting a cavity to receive the preform and further including a core configured to be received within the preform.

FIG. 7 is a cross section of a fourth embodiment of tooling for a condition station. The tooling shown in FIG. 7 may be similar to the tooling described above and illustrated in FIG. 5. For example, the tooling of FIG. 7 may include the mold 26B with cooling tubing 50 therein. In addition, the tooling may include a core 34D with a bubbler mechanism 42. However, in contrast to the core 34B, the core 34D may have two gas injection ports, which include gas injection port 58 (i.e., a first injection port 58) and a second gas injection port 68 (i.e., a second injection port 68). The second injection port 68 may be fluidly connected, along with the first injection port 58, with the gas channel 56 extending through the core 34D. The second injection port 68 is directed towards the preform 30, near the finish of the preform 30, and is positioned above the first injection port 58. As a result, the second injection port 68 is configured to function as a seal between the core 34D and the preform 30, to prevent air injected into the interior of the preform 30 from the first injection port 58 from inadvertently escaping from the interior of the preform 30. Specifically, as the gas channel 56 is pressurized with air, via the gas inlet 57, the first injection port 58 will direct pressurized air towards the shoulder of the preform to inflate the preform, while the second injection port 68 directs pressurized air towards the neck/finish of the preform 30 (above the shoulder of the preform 30 where the first injection port 68 is directed). As a result, the pressurized air provided by the second injection port 68 functions as a seal between the core 34D and the preform 30 (above the first injection port 58). In some embodiments, the second injection port 68 may include a physical seal, such as a rubber O-ring or gasket. In such embodiments, the pressurized air provided by the second injection port 68 will force the physical seal against the neck/finish of the preform to function as a seal between the core 34D and the preform 30.

In view of the above, the conditioning station tooling of FIG. 7 may function as follows-first, the thread splits 24 may transfer the preform 30 to the conditioning station. Next, the preform 30 can be shifted into the cavity presented by the mold 26B, via movement of the mold 26B upward towards the preform 30. Notably, however, the exterior surface of the preform 30 may not contact the mold 26, such that a gap 32 is present between the preform 30 and the mold 26B. The gap 32 may be created by pausing actuation of the mold 26B as it moves toward the preform 30. Such a pause in the actuation of the mold 26B may at least temporarily, prevent the mold 26B from actuating to a completely closed position around the preform 30.

In other embodiments, the gap 32 may be formed between the mold 26B and the preform 30 even with the mold actuated to the fully closed position (i.e., such that a pause in the movement of the mold 26B is not required). In such embodiments, the conditioning station may have one or more mechanical stop elements, such as structural standoffs between the mold 26B and the thread splits 24, that allow the gap 32 to be present even while the mold 26B is in the fully closed position. In still other embodiments, the blow molding machine may be configured, e.g., via programming of the control system, to shift the mold 26B to the fully closed position with the gap 32 being present.

In addition, the core 34D will be inserted within the preform 30, such that the core 34D is in contact with the interior surface of the preform 30. As such, and as with the embodiment described above for the conditioning station tooling illustrated in FIGS. 4 and 5, cooling airflow can be caused to flow in the gap 32 between the mold 26B and the preform 30 to cool or otherwise condition the exterior surface of the preform 30. In addition, water from the bubbler mechanism 42 of the core 34D can cool the core 34D, and thus, cool or otherwise condition the interior surface of the preform 30 due to the core 34D contacting the interior surface of the preform 30.

Next, if the mold 26B is not already in the fully closed position, the mold 26B can continue to move upward to the fully closed position, and the airflow through the gap 32 (via the gas inlet 36 and the gas outlet 38 of the mold 26B) can be halted. In addition, air can be caused to flow from the second injection port 68 of the core 34D to create a seal against the finish of the preform 30, above the first injection port 58. In some embodiments, including any of those described above with respect to FIGS. 4-7, a physical seal (e.g., a rubber O-ring or gasket) can be used as a direct seal between the core 34D and the preform 30. Regardless, pressurized air will also be injected into the interior of the preform from the first injection port 58, which is generally directed at the shoulder of the preform 30. Such injected air will inflate the preform 30 and force the exterior surface of the preform 30 against the mold 26B, where the exterior surface of the preform 30 can be cooled or otherwise conditioned by the mold 26B (with such cooling enhanced by the water flowing through the cooling tubing 50 of the mold 26B). It is noted that, as the with the embodiment of core 34C shown in FIG. 6 above, the distal end (or head) of the core 34D may be operably connected to an elongated piston 69 that extends centrally, along the length of the core 34D. In some embodiments, the head of the core 34D may form part of the piston 69. The piston 69 (and thus the head of the core 34D) may be extended downward via pressurized air being supplied to the cylinder space 66 positioned with an upper portion of the conditioning station tooling. The downward actuation of the piston 69 and, thus, the head of the core 34D may open a valve within the core 34D to activate the flow of air to each of the first and/or second injection port 58, 68. Such downward actuation of the head of the core 34D may also function to stretch or otherwise condition the preform 30. Regardless, once the supply of pressurized air to the cylinder space 66 is halted, the piston 69 (and thus the head of the core 34D) may be retracted upward via a spring force provided by the spring 67 also positioned within the upper portion of the conditioning station tooling and operably connected to the piston 69. The upward actuation of the piston 69 and, thus, the head of the core 34D may close the valve within the core 34D to deactivate the flow of air to each of the first and/or second injection port 58, 68.

In some embodiments, the mold 26B may include variational cooling in the form of several independent sets of cooling tubing 50 within the mold 26B (each independent set referred to herein as a cooling circuit). Such independent cooling circuits may be placed at specified locations within the mold 26B to provide different cooling rates to different portions of the preform 30. For example, separate cooling circuits may be arranged at distinct vertical positions within the mold 26B, with each cooling circuit configured to provide a distinct cooling rate to the preform 30. To provide distinct cooling rates, each cooling circuit can allow a cooling fluid to flow therethrough, with the cooling fluid having a different temperature that the cooling fluid flowing through other cooling circuits. Thus, the different cooling circuits can permit the mold 26B to have multiple cooling zones that each cool a specific portion of the preform 30 at a specific rate. Such differences in the cooling rates of the portions of the preform 30 can be beneficial in controlling the wall thicknesses of the preform 30 and of the resulting article that is formed at the blow station.

It is noted that upon injection of the pressurized air into the preform 30 to inflate the preform 30, any remaining air that was present in the gap 32 between the mold 26B and the preform 30 may be forced out of the gap 32 through the gas inlet 36 and/or gas outlet 38 of the mold 26B. After a sufficient amount of time has elapsed, the airflow from the core 34D (e.g., through the first and second injection ports 58,68) can be stopped. Specifically, the supply of pressurized air to the cylinder space 66 can be halted, such that the piston 69 and the head of the core 34D are retracted upward away from the preform 30. Such retraction of the head of the core 34D will cause the valve within the core 34D to close, thereby halting the airflow from the first and/or second injection port 58,68 of the core 34D into the interior of the preform 30. As such, the core 34D can be moved up away from the preform 30, and the mold 26B can be moved down away from the preform 30. The preform 30 may then, after being sufficiently cooled or otherwise conditioned, be transferred to the blow station to be blown into an article.

Embodiments of the present invention include additional configurations of conditioning station tooling molds that are capable of providing variational cooling. Specifically, in addition to the cooling tubing 50 for transmitting cooling liquid through the molds (e.g., mold 26B described above), certain other molds are configured to transmit cooling gases (e.g., air) through molds.

Figure 8:
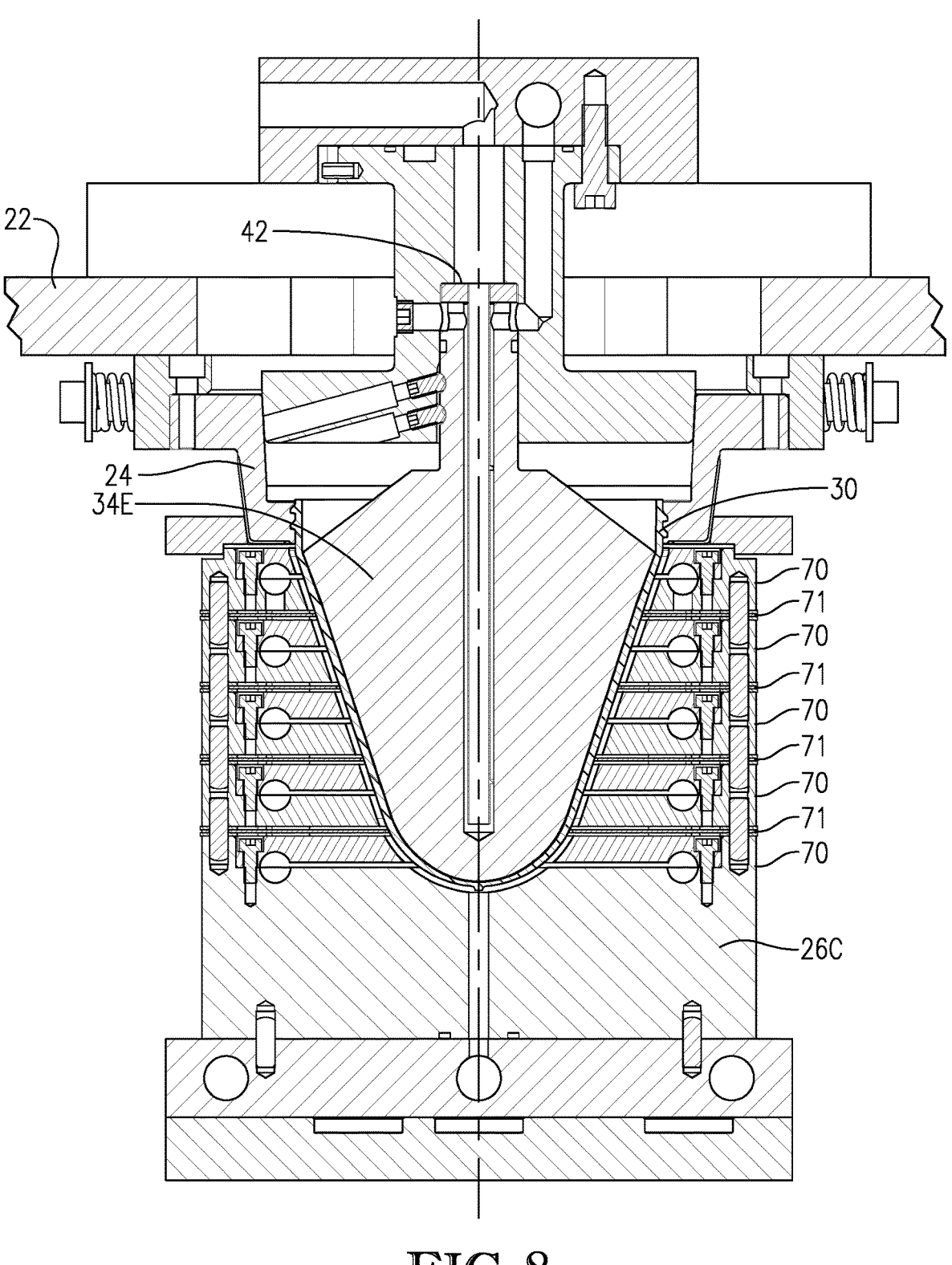
FIG. 8 is a cross section of thread splits supporting a preform with respect to conditioning station tooling according to a fifth embodiment, with the conditioning station tooling including a mold presenting a cavity to receive the preform and further including a core configured to be received within the preform, and with the mold comprising a plurality of cooling layers separated from each other by baffles.

In more detail, FIG. 8 illustrates a mold 26C forming part of conditioning station tooling. The mold 26C includes one or more (e.g., a plurality of) temperature adjusting layers (referred to herein as "cooling layers 70"), each being configured to transmit airflow through the mold 26C to the cavity of the mold 26C within which the preform 30 can be received. In some embodiments, the cooling layers 70 may each comprise generally annular or ring-shaped sections of material. However, embodiments may provide for the cooling layers 70 to be formed in other shapes, such as rectangles or cuboids. The mold 26C may have various numbers, as may be required to sufficiently provide variational cooling or other conditioning to the preform 30. The embodiments discussed herein include five cooling layers 70; however, more or fewer cooling layers 70 may be provided (e.g., one, two, three, four, five, six, seven, eight, nine, ten, or more cooling layers 70). Nevertheless, the cooling layers 70 are stacked on top of each other and held in place via a dowel pin and/or threaded fastener. A gasket or baffle 71 may be positioned between each of the adjacent cooling layers 70 to separate the cooling layers 70 and to provide a secure coupling of adjacent cooling layers 70. As a result, the entire stack of cooling layers 70 will form the mold 26C, including providing the cavity within which the temperature of the preform 30 can be conditioned. The cavity is illustrated in more detail in FIG. 9.

Figure 9:
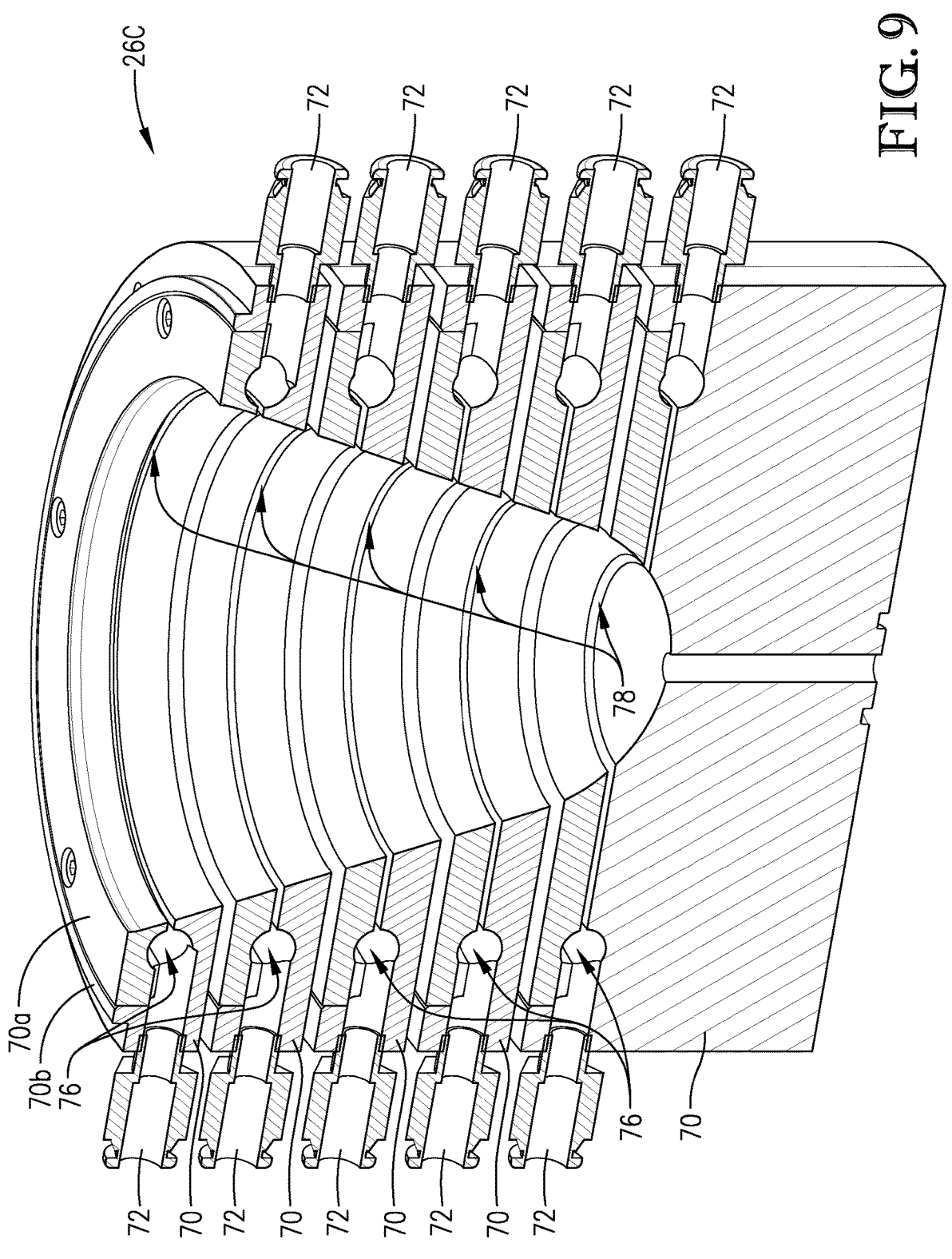
FIG. 9 is a perspective cross sectional view of the mold from FIG. 8, with the mold including the plurality of cooling layers but the baffles removed for clarity.

Each of the cooling layers 70 can be fluidly connected to a gas (e.g., air) source via one or more inlet ports 72, as shown in FIG. 9. As illustrated, inlet ports 72 may be positioned on opposite sides of each of the cooling layers 70. Air conduits (not shown) can be connected to the inlet ports 72 and can extend to the gas source, which may be in the form of a manifold. The manifold may include an adjustable valve associated with each inlet port 72 and/or each cooling layer 70 (e.g., five valves associated with each of five cooling layers 70), such that the flow of gas (e.g., air) through each of the cooling layers 72 can be individually controlled. Specifically, each of the valves may be separately adjusted (e.g., open, partially open, or closed), such that airflow (and perhaps air temperature) through each of the cooling layers 70 can be individually controlled. Air that is provided into the cooling layers 70 from the inlet ports 72 can exit the cooling layers 70 from the inlet ports 72 once the supply of airflow is halted from the source.

Remaining with FIG. 9, each of the cooling layers 70 may comprise an annular chamber 76 that extends around cooling layers 70. The chamber 76 is fluidly connected to the associated inlet ports 72 of the cooling layer 70, such that airflow can be introduced to the cooling layer 70 from the inlet ports 72 and flow around the chamber 76. In addition, the cooling layers 70 may each include an injection portion 78 that permits air to be injected from the chamber 76 of the cooling layer 70 into the cavity of the mold 26C to cool the exterior surface of the preform 30 (not shown in FIG. 9). The injection portion 78 for each of the cooling layers 70 of the mold 26C, as shown in FIG. 9, extends continuously around an inner periphery of the cooling layer 70. Specifically, the injection portion 78 is formed as a small air gap that extends around the inner periphery of the cooling layer 70. As such, for each cooling layer 70, the airflow from the injection portion 78 will be emitted around the entire circumferential area of the preform 30 that is aligned with the cooling layer 70.

Figure 10:
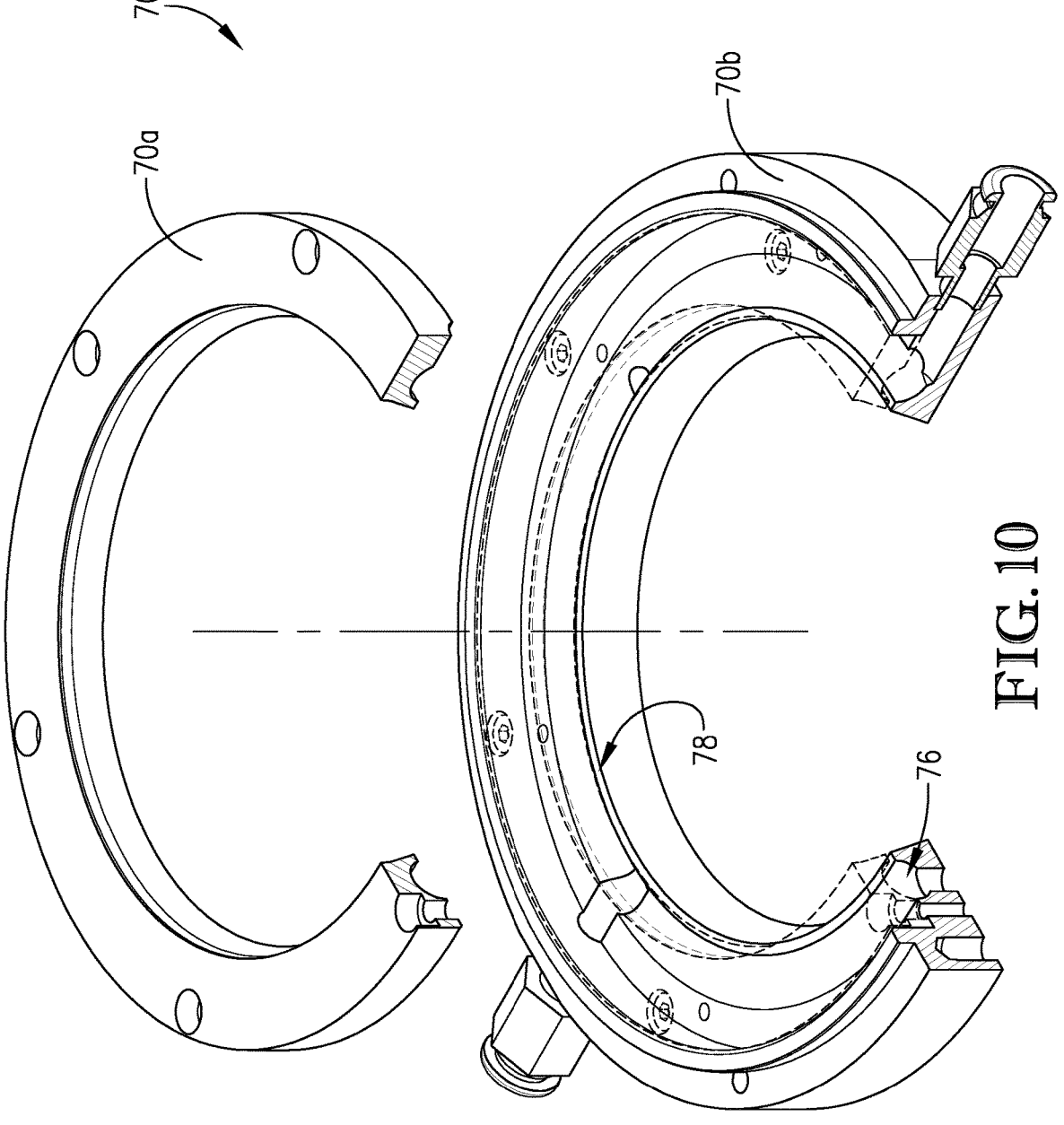
FIG. 10 is a top perspective view of one of the cooling layers from FIG. 9, with the cooling layer comprising an upper portion separated from a lower portion, and further illustrating the upper portion in broken line engaged with the lower portion.
Figure 11:
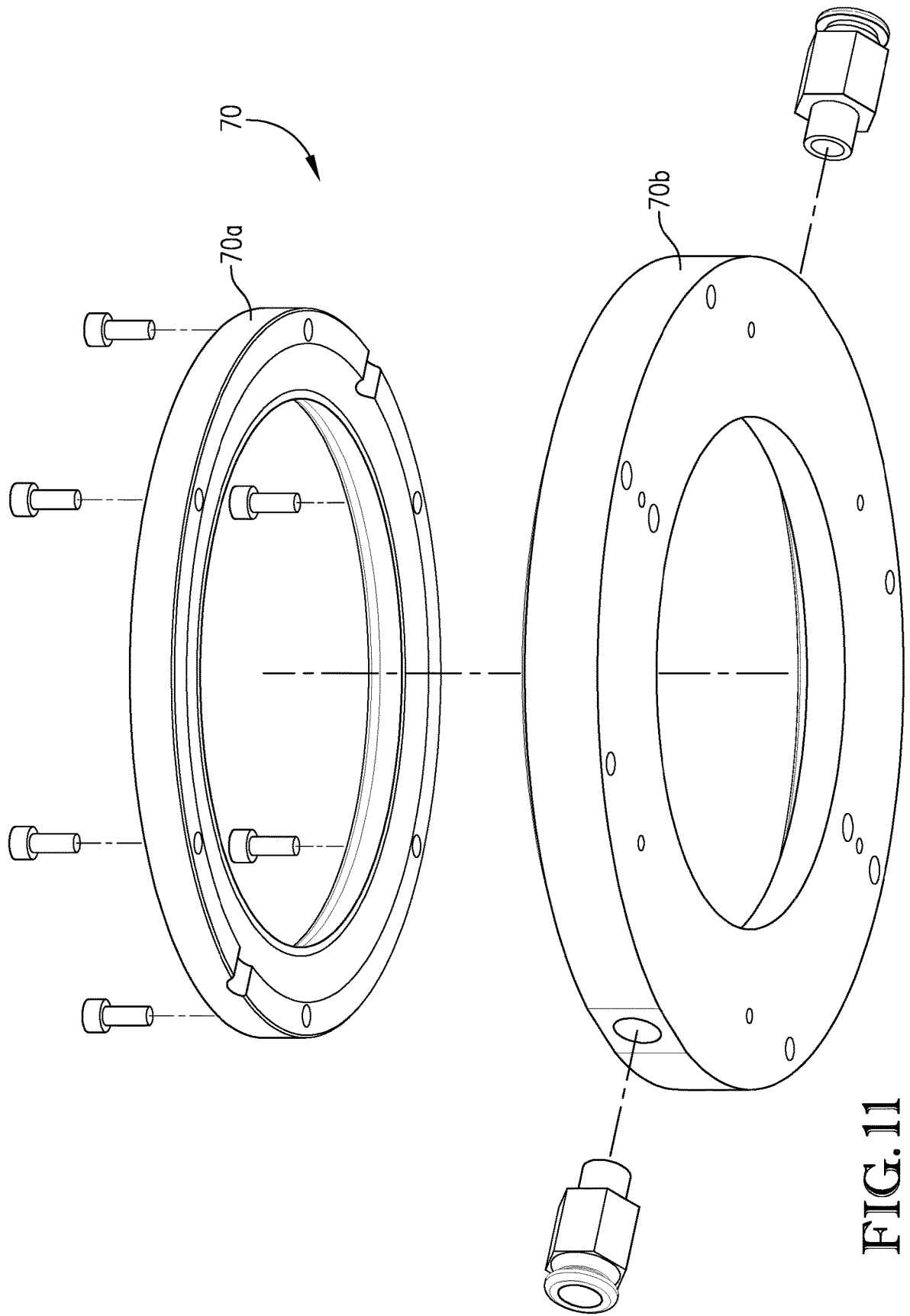
FIG. 11 is a lower perspective view of the cooling layer from FIG. 10, with the upper portion of the cooling layer separated from the lower portion.

In some embodiments, as illustrated in FIGS. 10 and 11, the cooling layers 70 may each be formed from an upper portion 70a and a lower portion 70b, that are separable from each other. However, when the upper and lower portions

70a,b are coupled together (to form the cooling layer 70), the portions 70a,b cooperatively define the annular chamber 76 and the injection portion 78. Alternatively, only one of the upper and lower portions 70a,b may form the injection portion 78.

In the configuration of the conditioning station tooling shown in FIG. 8, both the exterior surface and the interior surface of the preform 30 can be cooled, and the cooling provided by the mold 26C can include variational cooling. First, the thread splits 24 may transfer the preform 30 to the conditioning station. Next, the preform 30 can be shifted into the cavity presented by the mold 26C, via movement of the mold 26C upward towards the preform 30. Notably, however, the exterior surface of the preform 30 may not contact the cooling layers 70 of the mold 26C or the baffles 71. Instead, the mold 26C may be shifted upward until the exterior surface of the preform 30 is positioned adjacent to (without contacting) ends of the baffles 71 that extend further into the cavity of the mold 26C than the cooling layers 70. As a result, with the preform 30 positioned within the cavity of the mold 26C, a space will be present between each of the cooling layers 70 and the preform 30. The space may be created by pausing actuation of the mold 26C as the mold 26C moves toward the preform 30. Such a pause in the actuation of the mold 26C may at least temporarily, prevent the mold 26C from actuating to a completely closed position around the preform 30. Regardless, although the baffles 71 may not contact the preform 30, the ends of the baffles 71 will generally be positioned close enough to the preform 30 so as to create a fluid seal that prevents or substantially restricts airflow from passing between the ends of the baffles 71 and the preform 30, as perhaps best illustrated by FIG. 8.

In other embodiments, the space may be formed between the cooling layers 70 of the mold 26C and the preform 30 even with the mold 26C actuated to the fully closed position (i.e., such that a pause in the movement of the mold 26C is not required). In such embodiments, the conditioning station may have one or more mechanical stop elements, such as structural standoffs between the mold 26C and the thread splits 24, that allow the space to be present even while the mold 26C is in the fully closed position. In still other embodiments, the blow molding machine may be configured, e.g., via programming of a control system, to shift the mold 26C to the fully closed position with the space being present between the cooling layers 70 and the preform 30. In addition, the core 34E will be inserted within the preform 30, such that the core 34E is in contact with the interior surface of the preform 30. It is noted that the core 34E may include a bubbler mechanism 42.

As such, cooling airflow can be caused to flow from the inlet ports 72, through the chamber 76, and out the injection portion 78 of each of the cooling layers 70 to cool the exterior surface of the preform 30 As noted above, the mold 26C may include variation cooling with several independent sets of cooling layers 70 within the mold 26C (each independent set may be referred to as a cooling circuit). Regardless, due to each of the cooling layers 70 being separated from adjacent cooling layers 70 (e.g., above and below) by baffles 71 that provide a sealing connection with the preform 30, the airflow emitted by the injection portion 78 of a given cooling layer 70 will not travel beyond the adjacent baffles 71. Instead, the cooling airflow will remain within the space between the given cooling layer 70 and the preform 30 (or may flow within the chamber 76 of the given cooling layer 70).

In addition, as previously discussed, each cooling layer 70 may be individually connected to a gas source via a manifold with individually controlled valves. As a result, the amount of airflow, the time of airflow, and/or the temperature of the airflow to each of the cooling layers 70 can be individually controlled, with such airflow remaining generally within the space between the cooling layer 70 and the preform 30. Thus, because each cooling layer 70 is positioned at different vertical positions than other cooling layers 70, the mold 26C can provide different cooling rates to different portions of the preform 30. As a result, the different cooling layers 70 can permit the mold 26C to have multiple cooling zones that each cool a specific portion of the preform 30 at a specific rate (e.g., localized conditioning of the preform 30). Such differences in the cooling rates of the portions of the preform 30 can be beneficial in controlling the wall thicknesses of the preforms 30 and of the resulting articles that are formed at the blow station. Furthermore, it is noted that the mold 26C can be used to condition the preform before the preform 30 is entirely positioned within the cavity of the mold 26C. Specifically, the airflow to one or more (or all) of the cooling layers 70 can be initiated while the mold 26C is moving upward around the preform 30. Such pre-cooling may be used to achieve localized conditioning of the preform 30. For example, if the closed end or tip of the preform 30 requires additional cooling, airflow to the top-most cooling layer 70 can be activated as the tip of the preform 30 becomes aligned with the top-most cooling layer 70 during upward movement of the mold 26C. As such, cooling airflow can be directed from the top-most cooling layer 70 toward the tip of the preform 30. As the mold 26C continues to move upward, airflow to the lower cooling layers 70 can be sequentially activated, such that the lower cooling layers 70 will also direct a cooling airflow toward the tip of the preform 30 when there is alignment between one of the cooling layers 70 and the tip of the preform 30. As a result, the tip of the preform 30 can obtain an increased amount of cooling even while being inserted within the cavity of the mold 26C. Such cooling of the preform 30 can be applied to other portions of the preform 30 (other than the tip), as necessary, while the preform 30 is being inserted into the mold 26C cavity.

In addition to the above, water from the bubbler mechanism 42 can cool the core 34E, and thus, the interior surface of the preform 30 due to the core 34E contacting the interior surface of the preform 30. Thus, the preform 30 may, after being sufficiently cooled, be transferred to the blow station to be blown into an article.

Figure 12:
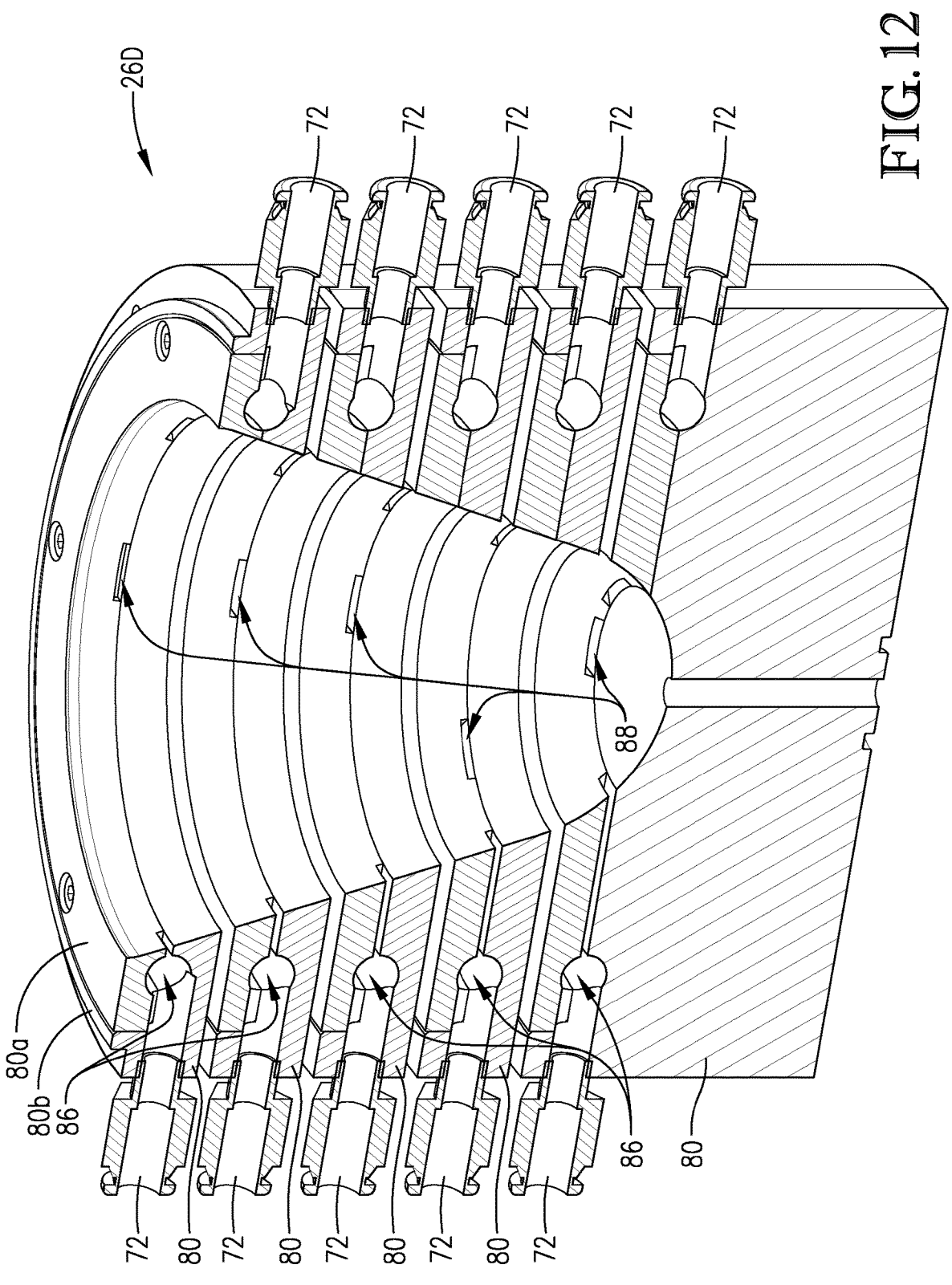
FIG. 12 is a perspective cross sectional view of a conditioning station mold according to another embodiment of the present invention, with the mold including a plurality of cooling layers.

FIG. 12 illustrates conditioning station mold 26D, which is similar to mold 26C, except that the mold 26D includes cooling layers 80 with an annular chamber 86 but with injection portions 88 that are different from the injection portions 78 of cooling layers 70. In more detail, for each of the cooling layers 80, the injection portions 88 comprise a plurality of rectangular, cuboid, or notch-shaped openings that are spaced apart around the inner periphery of the cooling layer 80. For each cooling layer 80, the chamber 86 is fluidly connected to the associated inlet ports 72 of the cooling layer 80, such that airflow can be introduced to the cooling layer 80 from the inlet ports 72 and will flow around the chamber 86. As the air is flowing through the chamber 86, portions of such air will be injected into the cavity of the mold 26D via the injection portions 88 to cool the exterior surface of the preform 30 (not shown in FIG. 12). The injection portions 88 for each of the cooling layers 80 of the mold 26D, as shown in FIG. 12, are spaced around the inner periphery of the cooling layer 80. As such, for each cooling layer 80, the airflow from the injection portions 88 will be emitted around portions of the circumferential area of the preform 30 that are aligned with the injection portions 88 of the cooling layer 80.

Figure 13:
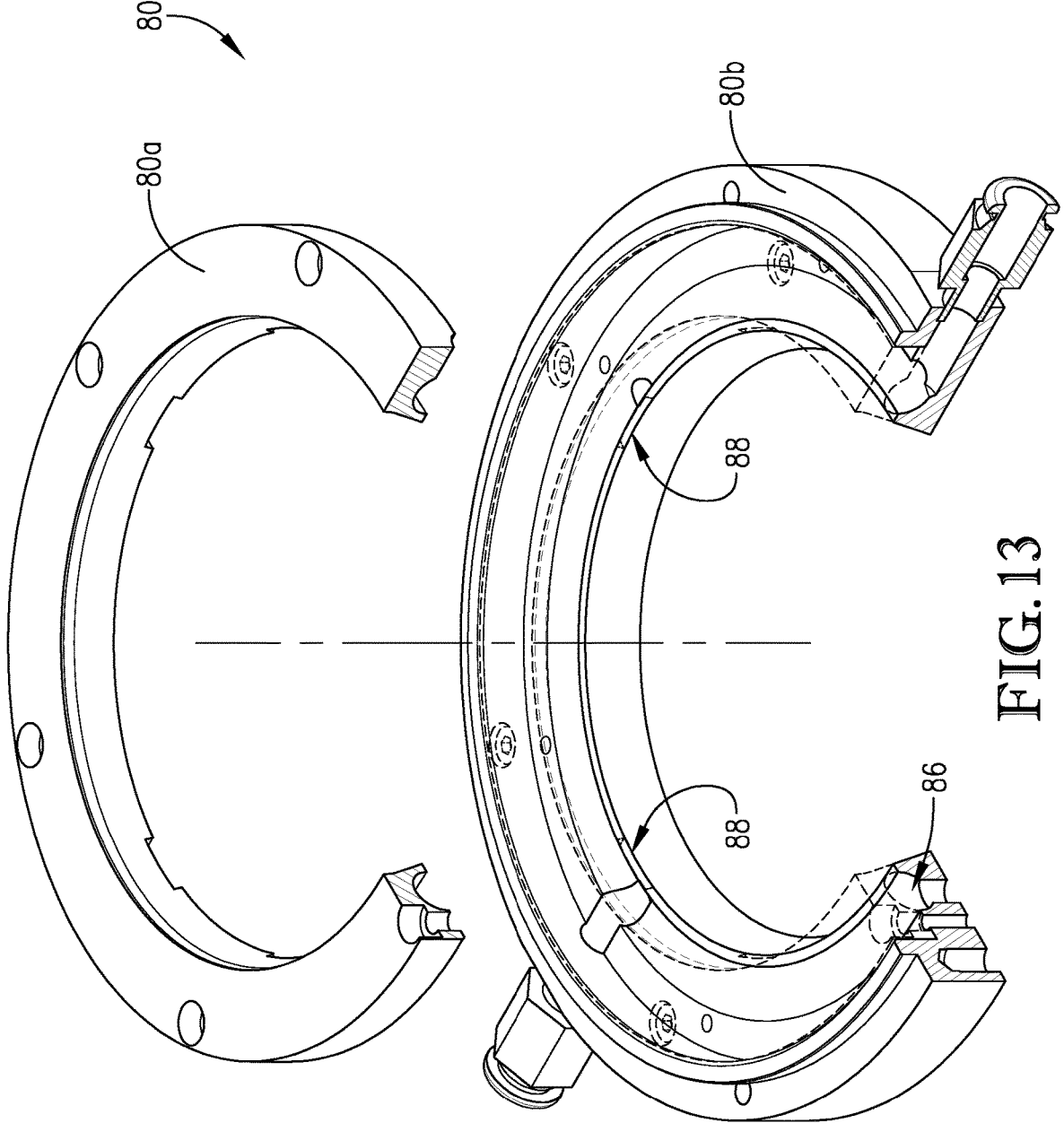
FIG. 13 is a top perspective view of one of the cooling layers from FIG. 12, with the cooling layer comprising an upper portion separated from a lower portion, and further illustrating the upper portion in broken line engaged with the lower portion.
Figure 14:
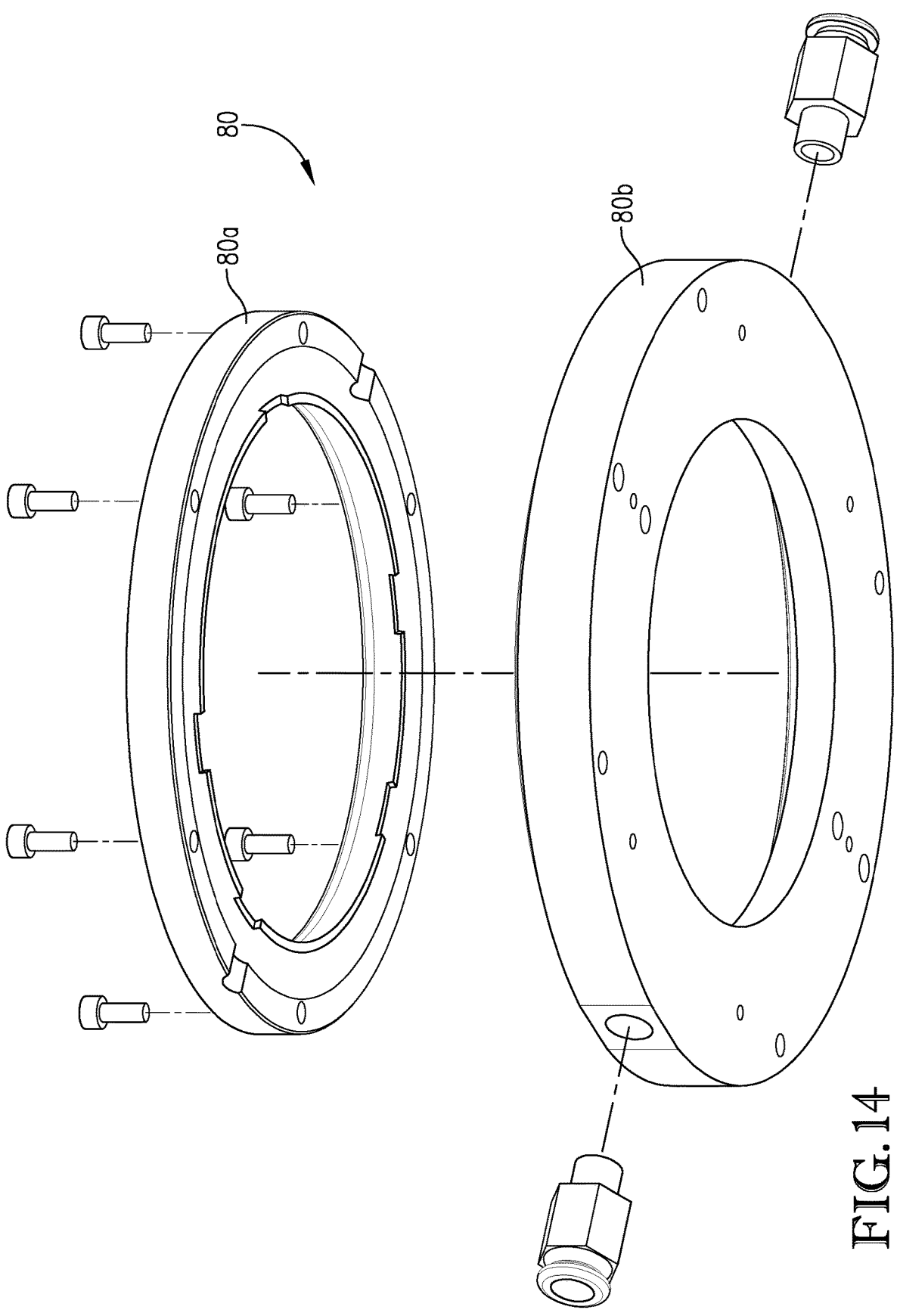
FIG. 14 is a lower perspective view of the cooling layer from FIG. 13, with the upper portion of the cooling layer separated from the lower portion.

In some embodiments, as illustrated in FIGS. 13 and 14, the cooling layers 80 may each be formed from an upper portion 80a and a lower portion 80b, that are separable from each other. However, when the upper and lower portions 80a,b are coupled together (to form the cooling layer 80), the portions 80a,b may cooperatively define the annular chamber 86 and the injection portions 88. Alternatively, only one of the upper and lower portions 80a,b may form the injection portions 88.

Figure 15:
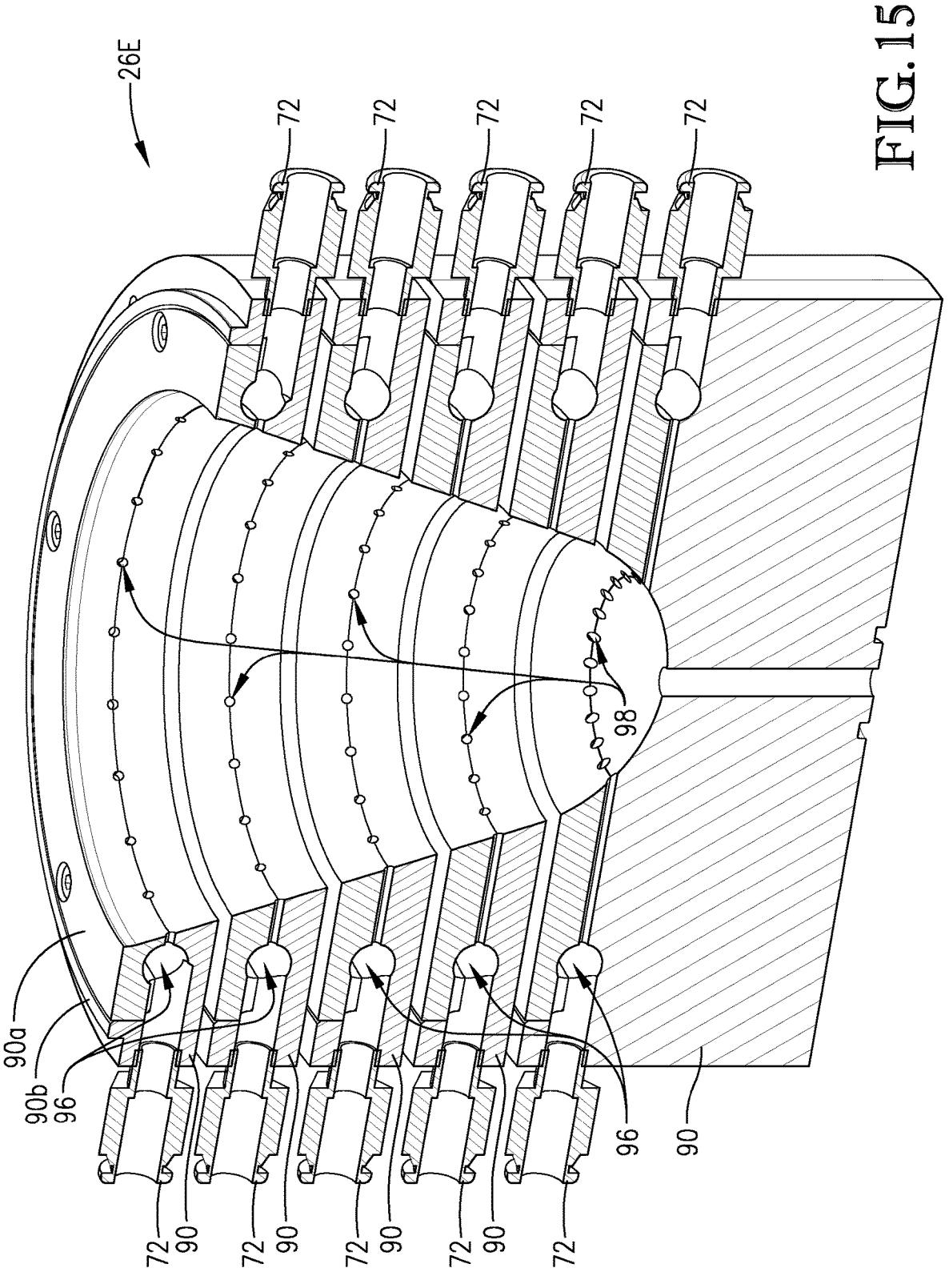
FIG. 15 is a perspective cross sectional view of a conditioning station mold according to yet another embodiment of the present invention, with the mold including a plurality of cooling layers.

FIG. 15 illustrates conditioning station mold 26E, which is similar to mold 26D, except that the mold 26E includes cooling layers 90 with an annular chamber 96 but with injection portions 98 that are different from the injection portions 88 of cooling layers 80. In more detail, for each of the cooling layers 90, the injection portions 98 comprise a plurality of circular, cylindrical, or pin-hole openings that are closely spaced apart around the inner periphery of the cooling layer 90. It is noted that each of the injection portions 98 may be smaller than the injection portions 88. Regardless, for each cooling layer 90, the chamber 96 is fluidly connected to associated inlet ports 72 of the cooling layer 90, such that airflow can be introduced to the cooling layer 90 from the inlet ports 72 and will flow around the chamber 96. As the air is flowing through the chamber 96, portions of such air will be injected into the cavity of the mold 26E via the injection portions 98 to cool the exterior surface of the preform 30 (not shown in FIG. 15). The injection portions 98 for each of the cooling layers 90 of the mold 26E, as shown in FIG. 15, are spaced around the inner periphery of the cooling layer 90. As such, for each cooling layer 90, the airflow from the injection portions 98 will be emitted around portions of the circumferential area of the preform 30 that are aligned with the injection portions 98 of the cooling layer 90.

Figure 16:
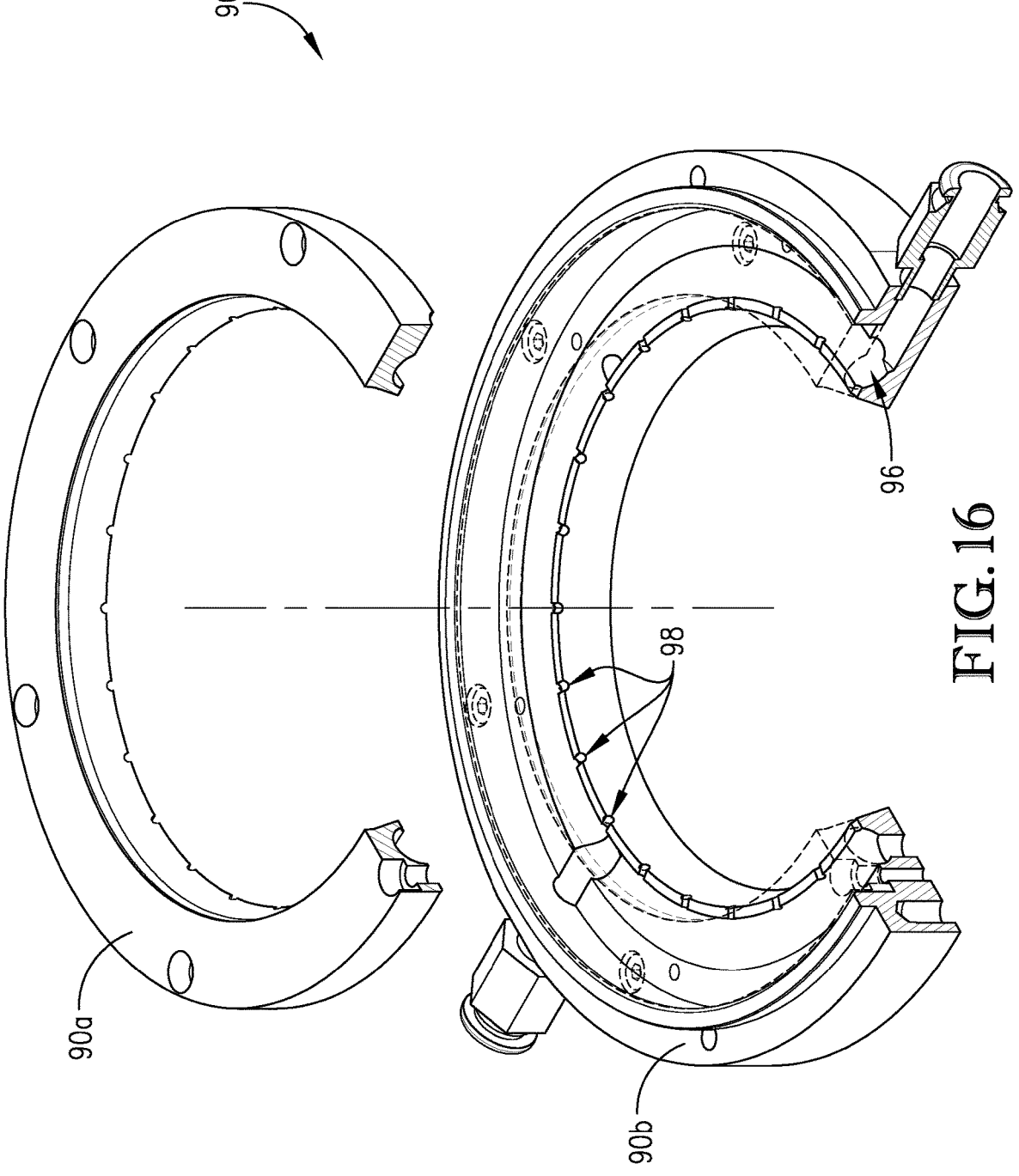
FIG. 16 is a top perspective view of one of the cooling layers from FIG. 15, with the cooling layer comprising an upper portion separated from a lower portion, and further illustrating the upper portion in broken line engaged with the lower portion.
Figure 17:
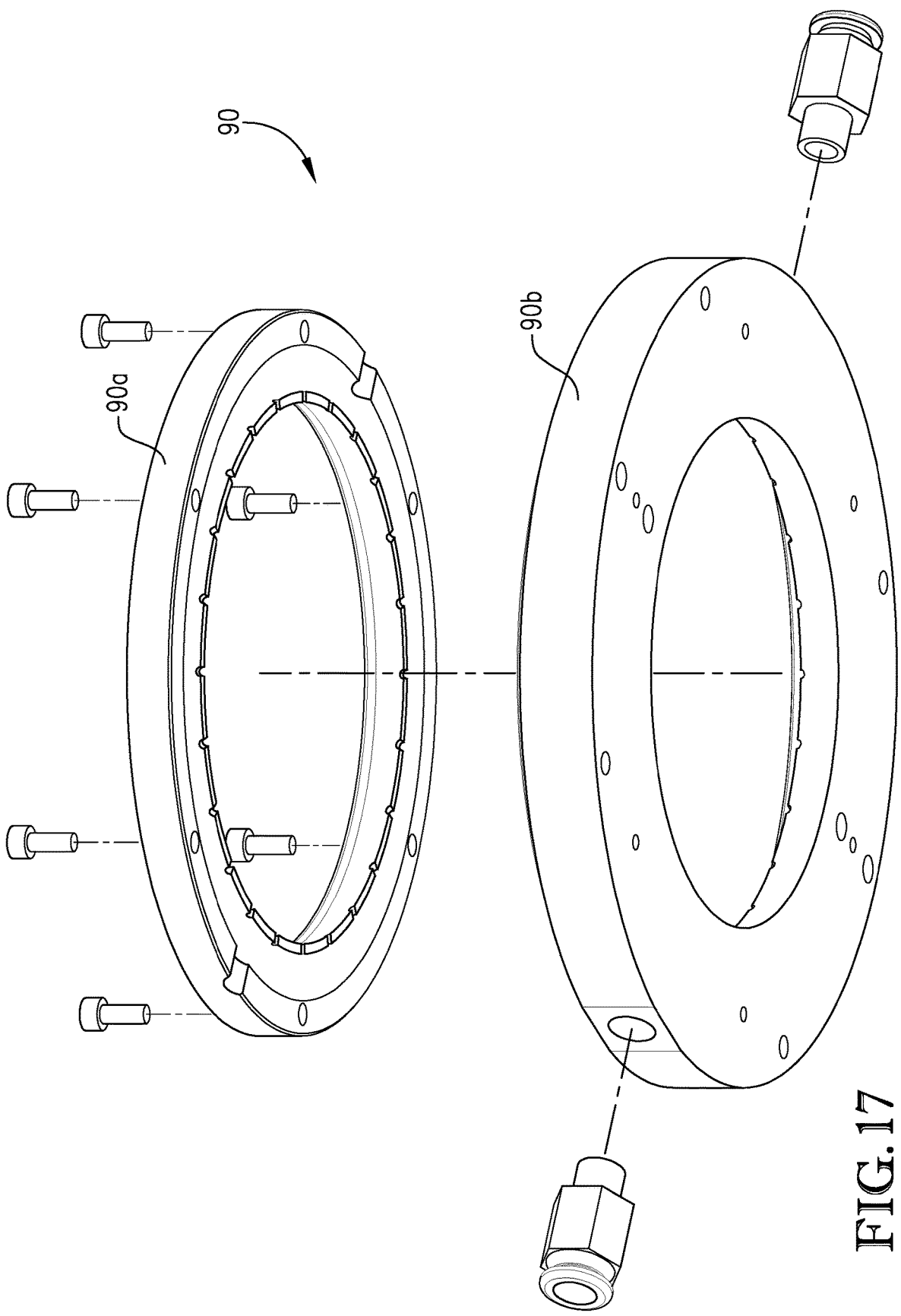
FIG. 17 is a lower perspective view of the cooling layer from FIG. 16, with the upper portion of the cooling layer separated from the lower portion.

In some embodiments, as illustrated in FIGS. 16 and 17, the cooling layers 90 may each be formed from an upper portion 90a and a lower portion 90b, that are separable from each other. However, when the upper and lower portions 90a,b are coupled together (to form the cooling layer 90), the portions 90a,b may cooperatively define the annular chamber 96 and the injection portions 98. Alternatively, only one of the upper and lower portions 90a,b may form the injection portions 98.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

What is claimed is:

1. Conditioning station tooling for adjusting a temperature of a preform, said tooling comprising:

a mold presenting a cavity configured to receive at least a portion of the preform, wherein the mold is configured to receive the preform such that a gap is present between the mold and the preform, wherein the mold includes an air inlet, wherein said conditioning station tooling is configured to permit air to be injected from the air inlet and through the gap between the mold and the preform; and a core configured to be received within an interior of the preform and configured to contact an interior surface of the preform, wherein the mold is configured to cool an exterior surface of the preform, wherein the mold comprises a plurality of cooling layers each being configured to direct cooling airflow toward the preform, wherein each cooling layer is separated from an adjacent cooling layer by a baffle.

2. The system of claim 1, wherein the mold further includes an air outlet, and wherein the air inlet is positioned at a bottom of the mold and the air outlet is located at a top of the mold.

3. The system of claim 1, wherein the core is configured such that a cooling fluid can flow through an interior of the core to aid in cooling the interior surface of the preform.

4. The system of claim 1, wherein the core is configured to supply air between the core and the preform to inflate the preform such that an exterior surface of the preform contacts the mold.

5. The system of claim 4, wherein the core includes an injection port configured to direct air towards a shoulder of the preform to inflate the preform.

6. The system of claim 5, wherein the injection port is a first injection port and wherein the core includes a second injection port positioned above the first injection port and configured to create a seal between the core and the preform.

7. The system of claim 4, wherein the core includes an injection port positioned at a distal end of the core and configured to direct air towards a bottom, interior surface of the preform to inflate the preform.

8. The system of claim 7, wherein the core includes an actuating tip positioned at the distal end of the core and configured to activate a valve to cause air to flow from the injection port into the preform.

9. The system of claim 1, wherein the mold includes tubing extending through the mold and configured to permit cooling liquid to flow through the tubing, wherein the mold is configured to cool the exterior surface of the preform when the exterior surface of the preform contacts the mold.

10. The system of claim 9, wherein the mold is configured to provide variational cooling to the preform, wherein the mold includes more than one cooling circuit of tubing extending through the mold, each being configured to permit cooling liquid to flow through the tubing.

11. The system of claim 10, wherein the cooling circuits are positioned at different positions along a height of the mold to provide variational cooling along different portions of a length of the preform.

12. The system of claim 11, wherein each of the cooling circuits is configured to provide a different temperature of cooling fluid to pass through the tubing of the respective cooling circuit.

13. The system of claim 1, wherein each cooling layer comprises a cooling circuit, with each cooling circuit positioned at different positions along a height of the mold to provide variational cooling along different portions of a length of the preform.

14. The system of claim 1, wherein the airflow to each cooling layer is configured to be individually controlled.

15. The system of claim 1, wherein a space is present between each cooling layer and the preform such that air can be injected from a given cooling layer toward the preform via the space associated with the given cooling layer, and wherein the air injected by the given cooling layer is prevented from passing to a space associated with an adjacent cooling layer by the baffles positioned on either side of the given cooling layer.

16. A method for manufacturing a preform, the method comprising:

(a) transporting the preform to a conditioning station of a blow molding machine; and (b) adjusting a temperature of the preform at the conditioning station, wherein said temperature adjusting of step (b) includes— inserting a core within an interior of the preform, positioning the preform at least partially within a cavity of a mold, with an exterior surface of the preform not contacting the mold, supplying air between the mold and the preform to condition the exterior surface of the preform, conditioning an interior surface of the preform via contact between the preform and the core, wherein the mold is configured to cool an exterior surface of the preform, wherein the mold comprises a plurality of cooling layers each being configured to direct cooling airflow toward the preform, wherein each cooling layer is separated from an adjacent cooling layer by a baffle.

17. The process of claim 16, further including the step of cooling an exterior surface of the preform via liquid or air flowing through the mold.

* * * * *